United States Patent
Kondo et al.

(10) Patent No.: US 8,687,230 B2
(45) Date of Patent: Apr. 1, 2014

(54) IMAGE PROCESSOR

(75) Inventors: Masaki Kondo, Toyoake (JP);
Tomohiko Hasegawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 951 days.

(21) Appl. No.: 12/413,133

(22) Filed: Mar. 27, 2009

(65) Prior Publication Data

US 2009/0244646 A1    Oct. 1, 2009

(30) Foreign Application Priority Data

Mar. 31, 2008  (JP) .................................. 2008-094232
Mar. 31, 2008  (JP) .................................. 2008-094257

(51) Int. Cl.
| | | |
|---|---|---|
| *H04N 1/60* | (2006.01) | |
| *G06F 15/00* | (2006.01) | |
| *G03F 3/08* | (2006.01) | |
| *G03F 3/10* | (2006.01) | |
| *H04N 1/00* | (2006.01) | |

(52) U.S. Cl.
CPC .............. *H04N 1/60* (2013.01); *H04N 1/6027* (2013.01); *H04N 1/0044* (2013.01); *H04N 1/00167* (2013.01); *H04N 1/00172* (2013.01)
USPC ............... 358/1.9; 358/1.1; 358/1.2; 358/2.1; 358/518; 358/520; 358/521; 358/527; 358/537; 358/538

(58) Field of Classification Search
CPC .......... H04N 1/00132; H04N 1/00196; H04N 9/735; H04N 1/00458; H04N 1/00198; H04N 1/0044; H04N 1/00161; H04N 1/00167; H04N 1/00172; H04N 1/6027; H04N 1/6077; H04N 1/32101; H04N 1/3225; H04N 2201/3253; H04N 1/00143
USPC ............ 358/1.9, 518–523, 537; 382/162–167
See application file for complete search history.

(56) References Cited

U.S. PATENT DOCUMENTS

| | | | | |
|---|---|---|---|---|
| 6,850,272 B1 * | 2/2005 | Terashita | ................... | 348/223.1 |
| 7,013,025 B2 * | 3/2006 | Hiramatsu | .................... | 382/103 |
| 7,148,990 B2 * | 12/2006 | Atkins et al. | ................. | 358/1.18 |
| 7,589,863 B2 * | 9/2009 | Kita | ............................... | 358/1.9 |
| 7,675,647 B2 * | 3/2010 | Tsue et al. | .................... | 358/1.9 |
| 7,768,681 B2 * | 8/2010 | Kuwata | ......................... | 358/518 |
| 7,908,547 B2 * | 3/2011 | Isomura et al. | ............... | 715/204 |

(Continued)

FOREIGN PATENT DOCUMENTS

| | | |
|---|---|---|
| JP | H09-322113 A | 12/1997 |
| JP | 2004-310436 A | 11/2004 |

(Continued)

OTHER PUBLICATIONS

JPO Machine Translation of JP2004-310436.*

(Continued)

*Primary Examiner* — Richard Zhu
(74) *Attorney, Agent, or Firm* — Baker Botts L.L.P.

(57) ABSTRACT

An image processor includes an acquiring unit that acquires a plurality of image files each corresponding to an image; a correction unit that corrects each image by conforming a characteristic quantity of each image to a reference characteristic quantity, the characteristic quantity representing image characteristic of each image; and an output control unit that outputs the corrected images on a same output plane.

5 Claims, 18 Drawing Sheets

(56) References Cited

U.S. PATENT DOCUMENTS

| | | | |
|---|---|---|---|
| 8,111,940 B2 * | 2/2012 | Okamoto | 382/274 |
| 2004/0258302 A1 | 12/2004 | Miwa et al. | |
| 2005/0019015 A1 | 1/2005 | Ackley et al. | |
| 2005/0134946 A1 * | 6/2005 | Tsue et al. | 358/537 |
| 2005/0207644 A1 | 9/2005 | Kitagawara et al. | |
| 2006/0228047 A1 | 10/2006 | Harada et al. | |
| 2007/0196098 A1 * | 8/2007 | Sugimoto | 396/234 |

FOREIGN PATENT DOCUMENTS

| | | |
|---|---|---|
| JP | 2004-310499 A | 11/2004 |
| JP | 2005-130254 A | 5/2005 |
| JP | 2005-269560 A | 9/2005 |
| JP | 2006-295314 A | 10/2006 |
| JP | 2006-343977 A | 12/2006 |
| JP | 2007-526659 A | 9/2007 |

OTHER PUBLICATIONS

Japan Patent Office; Office Action in Japanese Patent Application No. 2008-094257 (counterpart to the above-captioned U.S. patent application) mailed May 6, 2010.

Japan Patent Office; Office Action in Japanese Patent Application No. 2008-094232 (counterpart to the above- captioned U.S. patent application) mailed Apr. 20, 2010.

* cited by examiner

FIG.4

| 201 | 202 | 203 | 204 | 205 | 206 | 207 | 208 | 209 |
|---|---|---|---|---|---|---|---|---|
| 0 | "IMG01.jpg" | 0 | 1 | 1 | 0 | 20080115 | 125045 | 0 |
| 1 | "IMG02.avi" | 1 | 5 | 900 | 60 | 20080115 | 151320 | 2 |
| 2 | "IMG03.mov" | 2 | 5 | 1500 | 30 | 20080115 | 180632 | 2 |
| 3 | "IMG04.jpg" | 0 | 1 | 1 | 0 | 20080120 | 100516 | 0 |
| : |  |  |  |  |  |  |  |  |

| 301 | 302 | 303 | 304 | 305 | 306 | 307 |
|---|---|---|---|---|---|---|
| 0 | 0 | 1 | 0 | 20080115 | 125045 | 3232859013720 |
| 1 | 1 | 1 | 0 | 20080115 | 151320 | 0 |
| 2 | 1 | 1 | 180 | 20080115 | 151326 | 0 |
| 3 | 1 | 1 | 360 | 20080115 | 151332 | 0 |
| 4 | 1 | 1 | 540 | 20080115 | 151338 | 0 |
| 5 | 1 | 1 | 720 | 20080115 | 151344 | 0 |
| 6 | 2 | 1 | 0 | 20080115 | 180632 | 0 |
| 7 | 2 | 1 | 300 | 20080115 | 180636 | 0 |
| 8 | 2 | 1 | 600 | 20080115 | 180640 | 0 |
| 9 | 2 | 1 | 900 | 20080115 | 180644 | 0 |
| 10 | 2 | 1 | 1200 | 20080115 | 180648 | 0 |
| 11 | 3 | 1 | 0 | 20080115 | 180652 | 1806935971045 |
| 12 | 4 | 1 | 0 | 20080115 | 180656 | 1966405300645 |
| 13 | 5 | 1 | 0 | 20080115 | 180700 | 1811197383661 |
| 14 | 6 | 2 | 0 | 20080120 | 100516 | 2897807136486 |

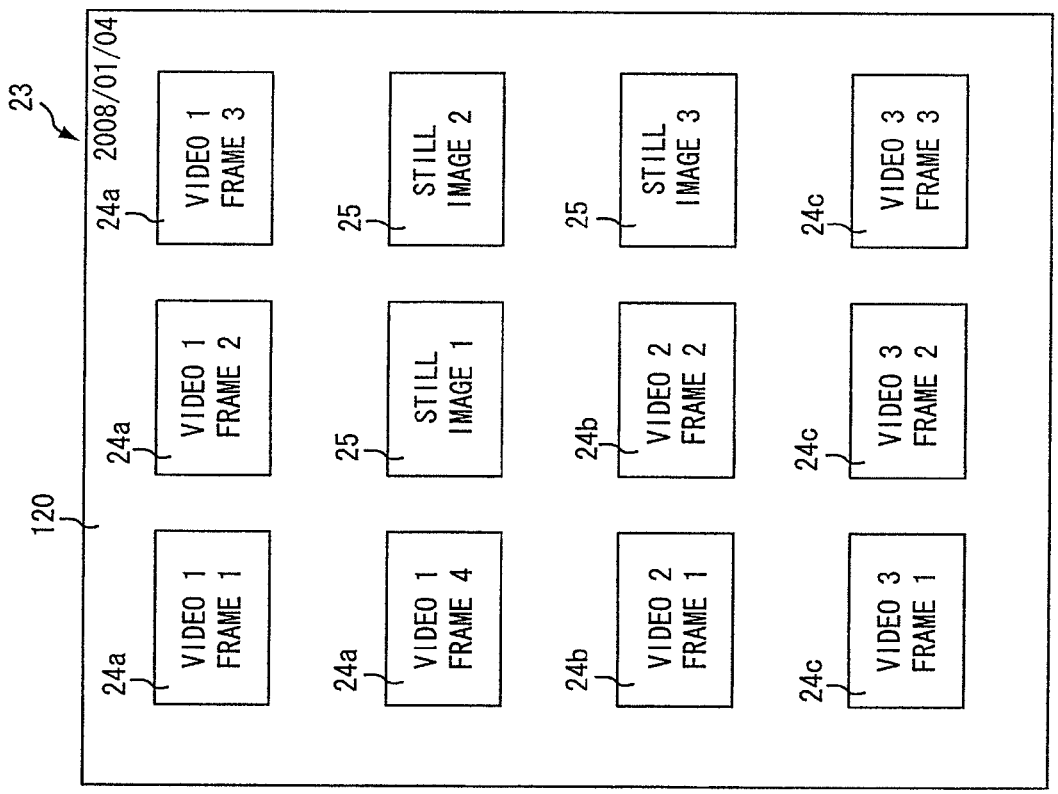
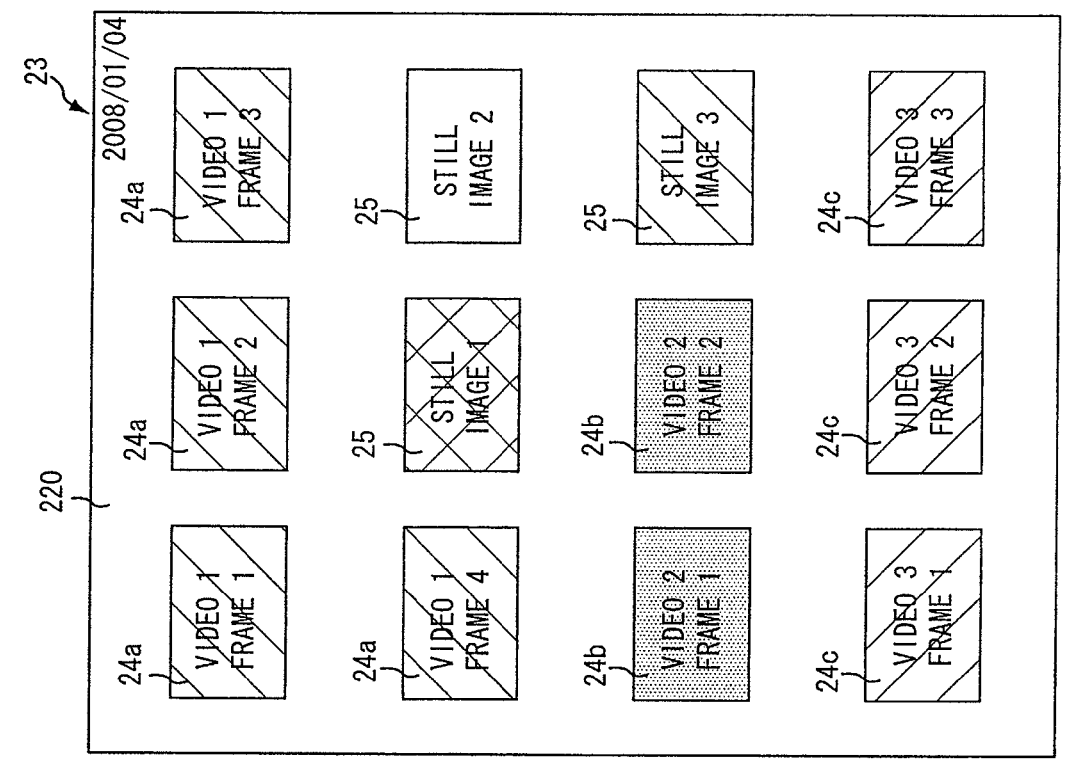

FIG.14

| 301 | 302 | 303 | 304 | 305 | 306 | 308 | 309 |
|---|---|---|---|---|---|---|---|
| 0 | 0 | | 0 | | | | 1 |
| 1 | 1 | 1 | 0 | 20080115 | 125045 | 0.74 | 2 |
| 2 | 1 | 1 | 180 | 20080115 | 151320 | 0.84 | 3 |
| 3 | 1 | 1 | 360 | 20080115 | 151326 | 0.43 | 4 |
| 4 | 1 | 1 | 540 | 20080115 | 151332 | 0.84 | 5 |
| 5 | 1 | 1 | 720 | 20080115 | 151338 | 0.65 | 6 |
| 6 | 2 | 1 | 0 | 20080115 | 151344 | 0.87 | 7 |
| 7 | 2 | 1 | 300 | 20080115 | 180632 | 0.50 | 8 |
| 8 | 2 | 1 | 600 | 20080115 | 180636 | 0.83 | 9 |
| 9 | 2 | 1 | 900 | 20080115 | 180640 | 0.78 | 10 |
| 10 | 2 | 1 | 1200 | 20080115 | 180644 | 0.65 | 11 |
| 11 | 3 | 1 | 0 | 20080115 | 180648 | 0.87 | 12 |
| 12 | 4 | 1 | 0 | 20080115 | 180652 | 0.69 | 13 |
| 13 | 5 | 1 | 0 | 20080115 | 180656 | 0.71 | 14 |
| 14 | 6 | 2 | 0 | 20080115 | 180700 | 0.58 | 1 |
| | | | | 20080120 | 100516 | 0.75 | |

IMAGE PROCESSOR

CROSS REFERENCE TO RELATED APPLICATION

The present application claims priority from Japanese patent applications No. 2008-094232 filed Mar. 31, 2008, and No. 2008-094257 filed Mar. 31, 2008. The entire contents of the priority applications are incorporated herein by reference.

TECHNICAL FIELD

The present invention relates to an image processor.

BACKGROUND

Since recent digital cameras are equipped to take both videos and still images, the user can decide whether to take still photographs or video footage based on the scene being filmed. For example, the user would likely take video of a scene with motion, such as an activity at a sports event, and would likely take a still image of a scene with no motion, such as a group photo.

There have been proposed devices for printing out and displaying an image list combining still images with frame images extracted from single frames of a video taken with this type of digital camera. For example, Japanese Patent Application Publication No. 2005-130254 describes a print system for displaying frame images and still images on a display in a manner that distinguishes the two types of images.

SUMMARY

However, the frame images and still images included in the image list displayed on the display are visually inconsistent in the print system described in Japanese unexamined patent application publication No. 2005-130254. Specifically, since the main function of the digital camera is to take still images, the frame images constituting a video taken on a digital camera have a smaller image size than the still images. Further, since videos are taken over a continuous period of time, flash settings and adjustments in ISO sensitivity, F-stop numbers, white balance, and the like for improving conditions during the period of filming differ from those used when taking still photographs. When the conditions of filming change during continuous video, such as when the digital camera is moved from indoors to outdoors during filming, color cast may occur in the video until the white balance and the like can be adjusted, resulting in a tendency for more unwanted tints in frame images of a video than in still images. Consequently, an image list combining frame images and still images has an unpleasant appearance, lacking a sense of uniformity between frame images and still images.

Further, since the light source varies among a still image taken in the morning, a video taken in the evening, a still image taken indoors, and the like, some of the images appear yellowish and others bluish. When these images are laid out in an image list, there is no uniformity of color among the images, and the image list is consequently visually unappealing.

In view of the foregoing, it is an object of the present invention to provide an image processor capable of outputting an image list of images whose colors are visually consistent.

To achieve the above and other objects, one aspect of the invention provides an image processor including an acquiring unit that acquires a plurality of image files each corresponding to an image; a correction unit that corrects each image by conforming a characteristic quantity of each image to a reference characteristic quantity, the characteristic quantity representing image characteristic of each image; and an output control unit that outputs the corrected images on a same output plane.

BRIEF DESCRIPTION OF THE DRAWINGS

In the drawings:

FIG. 4 conceptually illustrates a structure of a file data storage area according to the first embodiment according to the first embodiment;

FIG. 5 conceptually illustrates a structure of a layout data storage area according to the first embodiment;

FIG. 13A shows an example of an image list that the MFP according to the second embodiment prints out on one sheet of a recording paper;

FIG. 13B shows an image list printed out on one sheet of recording paper by a device different from the MFP according to the second embodiment;

FIG. 14 conceptually illustrates a structure of a layout data storage area according to the second embodiment;

DETAILED DESCRIPTION

Figure 1:
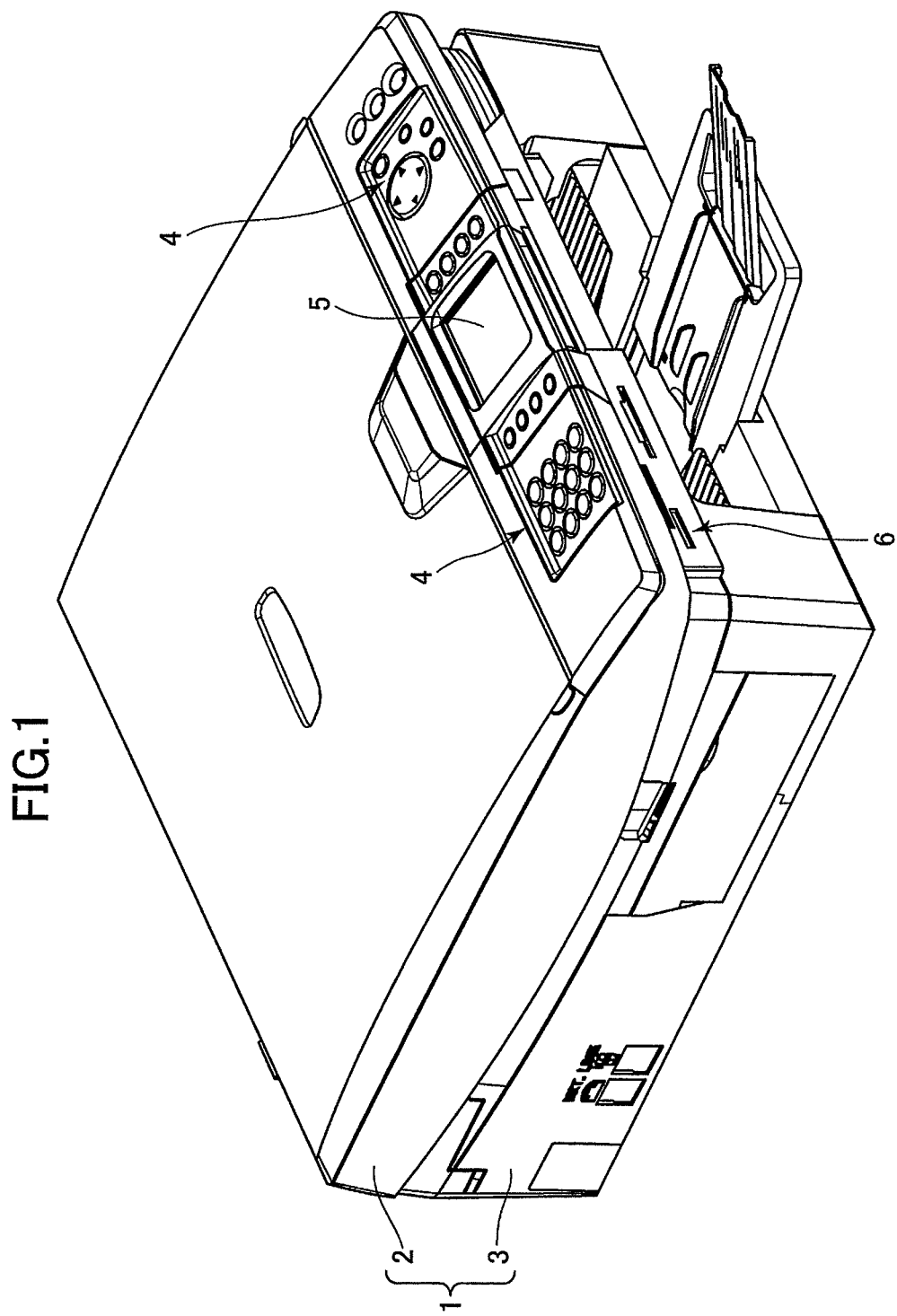
FIG. 1 is a perspective view showing an external structure of a multifunction peripheral (MFP) according to the first embodiment of the present invention.

Next, An image processor according to an embodiment of the present invention will be described while referring to the accompanying drawings. FIG. 1 is a perspective view showing the external structure of a multifunction peripheral (hereinafter abbreviated as "MFP") 1 as this embodiment of the image processor according to the present invention. A particular feature of the MFP 1 according to this embodiment is its ability to output a list of images combining frame images extracted from videos and still images, while maintaining a sense of visual uniformity between the frame images and still images.

The MFP 1 is provided with multiple functions, including a photocapture function, a copier function, a scanner function, and a media capture function. Through the media capture function, the MFP 1 can execute processes for reading image files from a media card mounted in a slot section 6 described later and for printing out these image files, for displaying images on an LCD 5 described later corresponding to image files read from the media card, and for saving image files scanned by the scanner function on the media card.

The MFP 1 houses a scanner 2 in the upper section thereof for scanning original documents, and an inkjet printer 3 disposed beneath the scanner 2 for printing images on recording paper.

The slot section 6 is provided on the front surface of the MFP 1 and includes multiple card slots in which media cards, such as a CompactFlash (registered trademark) card and an SD card can be directly inserted.

The scanner 2 is a flatbed scanner having a document cover. Just forward of the document cover, the MFP 1 is provided with a control panel including an operating section 4 configured of a plurality of keys, and the LCD 5 configured of a touch panel. The MFP 1 displays operating procedures and the status of current processes on the LCD 5 and displays data on the LCD 5 corresponding to operations performed on the operating section 4.

Figure 2:
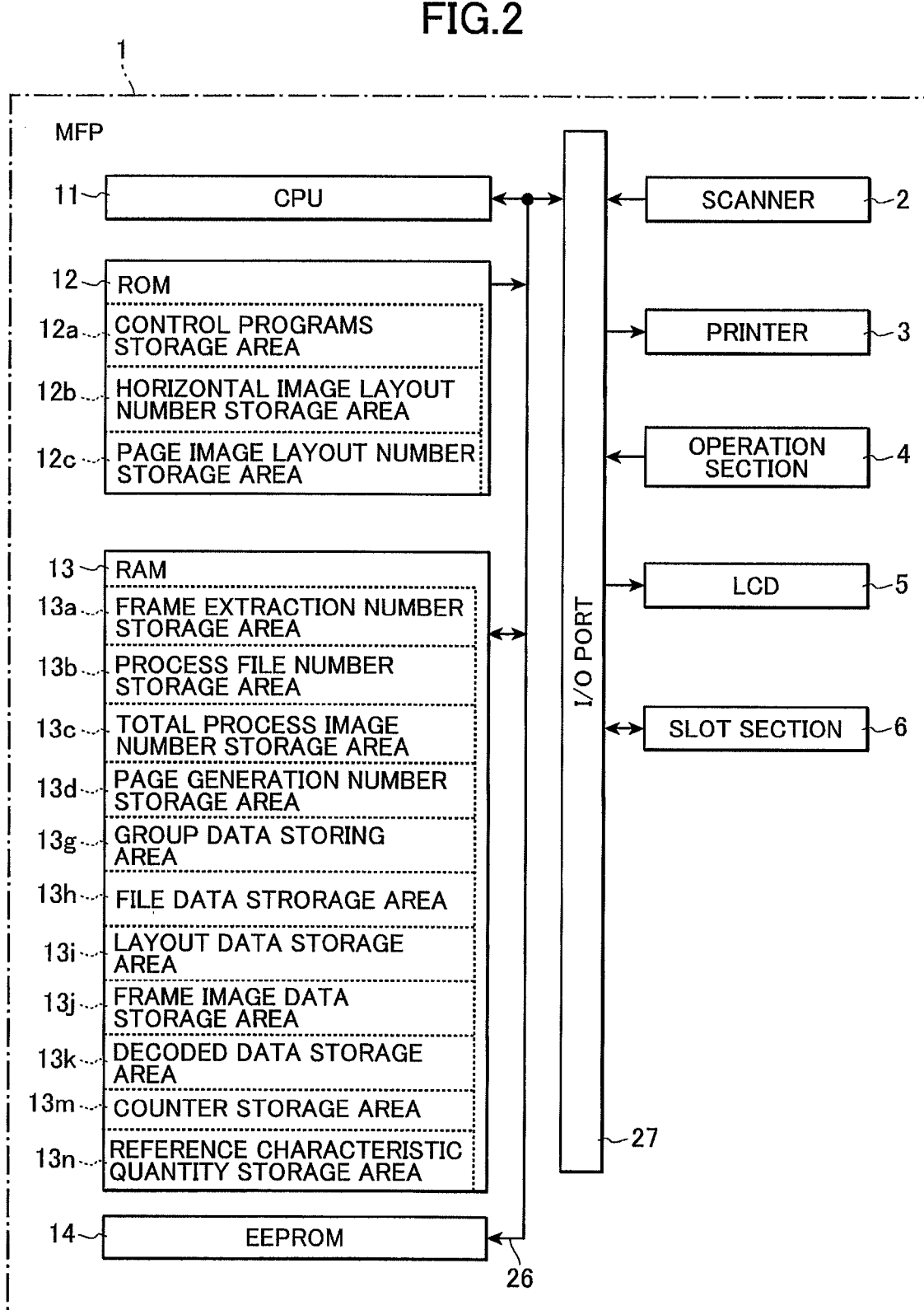
FIG. 2 is a block diagram showing an electrical structure of the MFP according to the first embodiment.

Next, the electrical structure of the MFP 1 will be described with reference to FIG. 2. FIG. 2 is a block diagram showing the electrical structure of the MFP 1. The MFP 1 primarily includes a CPU 11, a ROM 12, a RAM 13, an EEPROM 14, the scanner 2, the printer 3, the operating section 4, the LCD 5, and the slot section 6.

The CPU 11, ROM 12, RAM 13, and EEPROM 14 are interconnected via a bus line 26. The scanner 2, printer 3, operating section 4, LCD 5, slot section 6, and bus line 26 are also interconnected via an I/O port 27.

The CPU 11 controls the various functions possessed by the MFP 1 and each component connected to the I/O port 27 according to fixed values and programs stored in the ROM 12, RAM 13, and EEPROM 14.

The ROM 12 is a nonvolatile memory capable of preserving stored data even when the power is interrupted. The ROM 12 stores control program storage area 12a for storing control programs executed by the CPU 11. The control programs control programs stored in the control program storage area 12a include programs for implementing the processes described later with reference to the flowcharts in FIGS. 7 through 11.

In addition to the control program storage area 12a, the ROM 12 is provided with a horizontal image layout number storage area 12b, and a page image layout number storage area 12c.

The horizontal image layout number storage area 12b is a memory area storing a "horizontal layout number," indicating the number of index images that can be laid out horizontally in a list of images. In the MFP 1 of this embodiment, the horizontal image layout number storage area 12b stores a plurality of horizontal layout numbers corresponding to predetermined paper sizes (L-size, A4-size, letter size, etc.) and printing modes (fine, normal, draft, etc.). When performing a layout printing process described later with reference to FIGS. 10 and 11, the MFP 1 reads and employs a suitable value from among the plurality of horizontal layout numbers.

The page image layout number storage area 12c is a memory area storing a "page layout number," indicating the maximum number of index images in an image list that can be arranged on a single sheet of recording paper. The page image layout number storage area 12c in this embodiment stores a plurality of page layout numbers for predetermined paper sizes and printing modes. In the layout printing process described later with reference to FIGS. 10 and 11, the MFP 1 reads and employs a suitable value from among these page layout numbers.

The RAM 13 temporarily stores various data produced when the MFP 1 executes various operations. The RAM 13 is provided with a frame extraction number storage area 13a, a process file number storage area 13b, a total process image number storage area 13c, a page generation number storage area 13d, a group data storage area 13g, a file data storage area 13h, a layout data storage area 13i, a frame image data storage area 13j, a decoded data storage area 13k, a counter storage area 13m, and a reference characteristic quantity storage area 13n.

Here, terminology used in this embodiment will be defined. The term "video" in the preferred embodiment denotes a moving image reproduced by displaying a plurality of frame images in succession. A "video file" is a file containing data for playing a video, such as an AVI video file or a QuickTime video file. The video file may be of any format, provided that the file contains data that can be used to playback video images.

The frame extraction number storage area 13a is a memory area storing a "frame image extraction number," denoting the number of frame images for which corresponding frame image data is to be extracted per video file. If the frame image extraction number is "5", for example, the MFP 1 extracts frame image data for five frames per video file and lays out five index images per video file in an image list based on the extracted frame image data.

In this embodiment, the MFP 1 stores an arbitrary value inputted by the user via the operating section 4 in the frame extraction number storage area 13a as the frame image extraction number. However, the frame image extraction number may also be stored in the ROM 12 or the like in advance or may be automatically set according to a predetermined relationship; for example, the frame image extraction number may be set increasingly larger for increasingly larger sizes of video files.

The process file number storage area 13b is a memory area storing a "total number of process files," denoting the total number of still image files and video files stored on the media card.

The total process image number storage area 13c is a memory area storing a "total number of process images," indicating the total number of index images to form in the image list. The page generation number storage area 13d is a memory area storing a "page generation number," denoting the total number of pages of the image list to output when executing the layout printing process described later with reference to FIGS. 10 and 11.

The group data storage area 13g, file data storage area 13h, and layout data storage area 13i will be described later with reference to FIGS. 4 through 6.

The frame image data storage area 13j is a memory area storing frame image data extracted from a video file. The decoded data storage area 13k is a memory area storing the results of a process to decode frame image data or the results of a process to decode a still image file. The counter storage area 13m is a memory area storing various counter values. The EEPROM 14 is a nonvolatile writable memory.

The reference characteristic quantity storage area 13n stores reference characteristic quantities calculated from characteristic quantities (image size and image color) of one or more still images to be used as reference values. Since each index image outputted in the image list is corrected based on these reference characteristic quantities, the MFP 1 of this embodiment can achieve visual uniformity among index images in the image list.

Figure 3A:
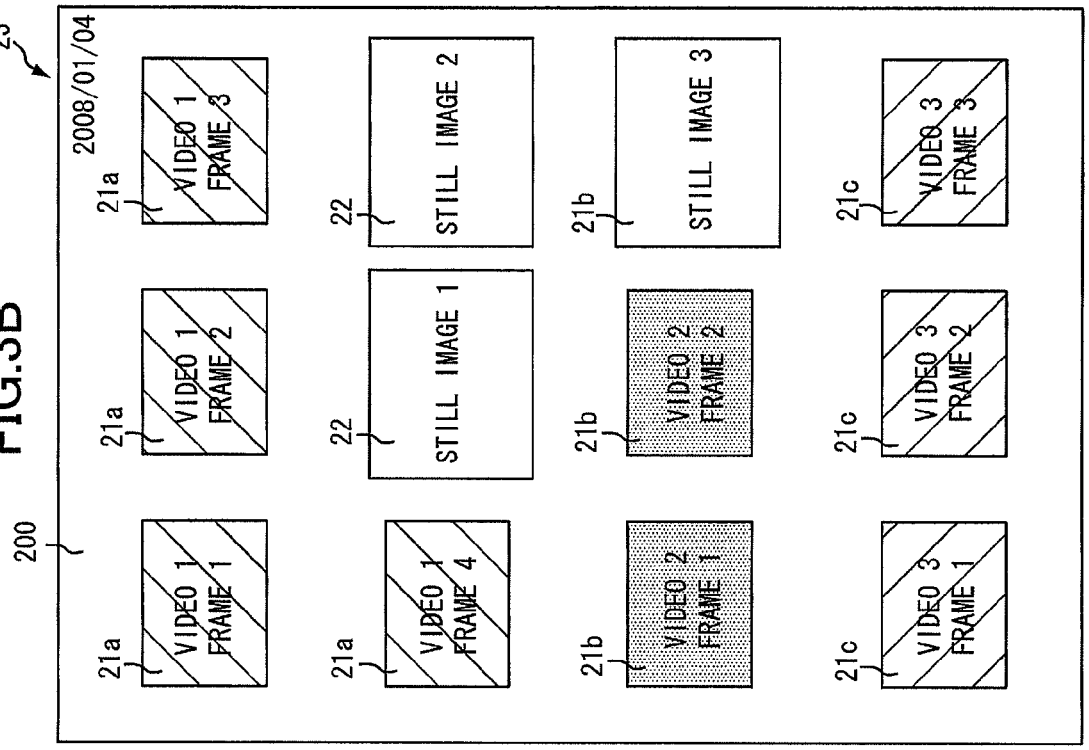
FIG. 3A shows an example of an image list that the MFP according to the first embodiment prints out on one sheet of a recording paper.

FIG. 3A shows an example of an image list 20 that the MFP 1 prints out on one sheet of a recording paper. When still image files and video files are combined on a media card, the MFP 1 outputs the image list 20 having a combination of index images 21a, 21b, and 21c corresponding to frame image data extracted from one or more video files and index images 22 corresponding to still image files, as shown in FIG. 3A. Accordingly, the user can perceive that the index images 21a, 21b, and 21c indicate content of video files and that the index images 22 indicate content of still image files at a glance when viewing a single page of the image list 20, making browsing more user-friendly.

Figure 3B:
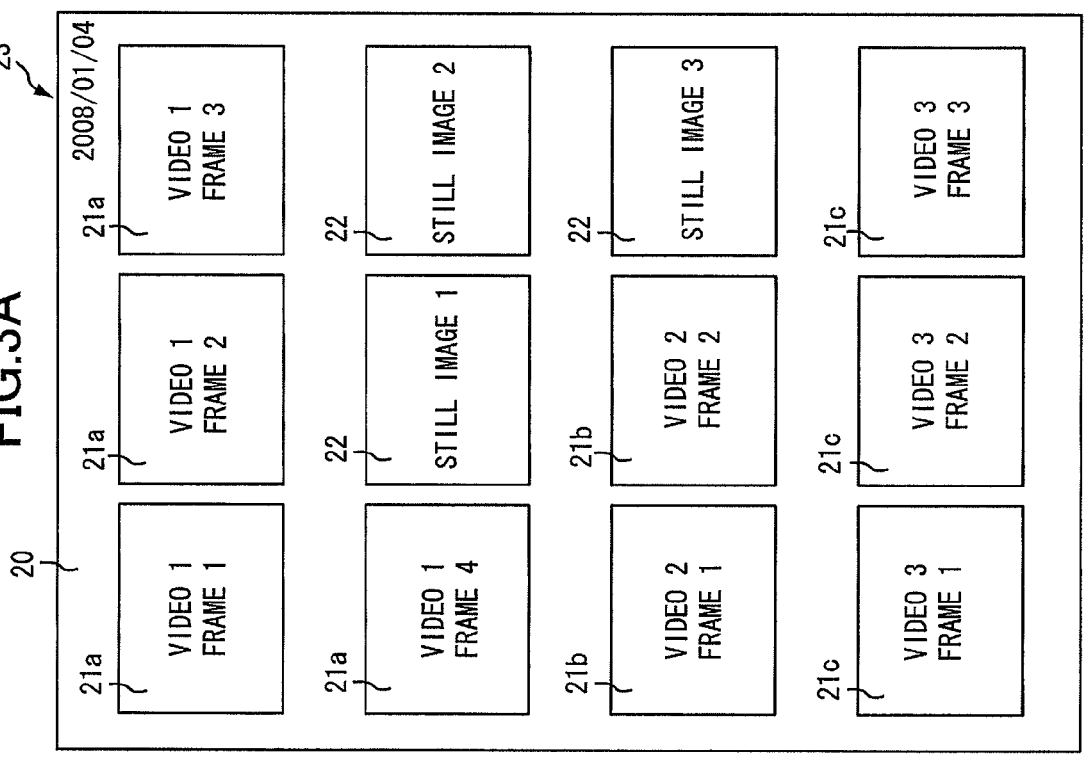
FIG. 3B shows an image list printed out on one sheet of recording paper by a device different from the MFP according to the first embodiment.

FIG. 3B, on the other hand, shows an image list 200 printed out on one sheet of recording paper by a device different from the MFP 1 according to the present invention. Both image lists 20 and 200 in FIGS. 3A and 3B include sets of index images 21a, 21b, and 21c, each set corresponding to frame images extracted from the same video files, and index images 22 corresponding to same still image files and are printed out on one page of recording paper.

Therefore, like the image list 20 shown in FIG. 3A, the image list 200 shown in FIG. 3B includes four index images 21a corresponding to frame images extracted from a first video file, two index images 21b corresponding to frame images extracted from a second video file, three index images 21c corresponding to frame images extracted from a third video file, and three index images 22 corresponding to three still image files.

However, in the image list 200 shown in FIG. 3B, the size of the index images 21a, 21b, and 21c corresponding to frame images extracted from video files is different from the size of the index images 22 corresponding to still image files. Further, there is no uniformity of color among the index images (hatching and dot patterns in the index images 21a, 21b, and 21c shown in FIG. 3B indicates that each of the index images 21a, 21b, and 21c has a different color cast). This is because index images 21a, 21b, and 21c corresponding to frame images extracted from video files have a greater tendency toward exhibit color cast than still image files because different techniques for adjusting flash settings, ISO sensitivity, F-stop numbers, white balance, and the like are used in video.

Consequently, when index images 21a, 21b, and 21c corresponding to frame images extracted from video files are combined with index images 22 corresponding to still image files, as in the image list 200 shown in FIG. 3B, there is a visual inconsistency between the index images, detracting from the appearance of the image list 200.

In the image list 20 shown in FIG. 3A, on the other hand, the index images 21a, 21b, and 21c corresponding to frame images extracted from video files and the index images 22 corresponding to still image files have been rendered at the same size and in the same color.

Specifically, when printing out the image list 20 having a combination of index images 21a, 21b, 21c, and 22, the MFP 1 corrects the index images 21a, 21b, 21c, and 22 using techniques described later in order to output an image list 20 maintaining visual uniformity between index images 21a, 21b, 21c, and 22.

The MFP 1 also determines a layout order for each of the index images 21a, 21b, 21c, and 22 so that the group of images is arranged in an order based on the capture date and time of the images, and prints out the image list 20 having the index images 21a, 21b, 21c, and 22 arranged according to this predetermined layout order.

Although FIG. 3A is merely one example of the image list 20, the MFP 1 determines the layout order of the index images 21a, 21b, 21c, and 22. The index images 21a, 21b, 21c, and 22 in each row are arranged in ascending order of the capture date and time from left-to-right in the image list 20. That is, the capture date and time of the leftmost index image 21a, 21b, 21c, or 22 is earlier than that of the rightmost index image 21a, 21b, 21c, or 22. Further, the index images 21a, 21b, 21c, and 22 in one row are arranged above the index images 21a, 21b, 21c, and 22 in another row in ascending order of the capture date and time. That is, the capture date and time of the rightmost index image 21a, 21b, 21c, or 22 in one row is earlier than that of the leftmost index image 21a, 21b, 21c, or 22 in another row.

As will be described later in greater detail, the MFP 1 determines a layout order for sorting the index images 21a, 21b, 21c, and 22 in the image list 20 based only on the capture date and time, not on whether the index images are based on a still image file or a video file. Hence, even if the user cannot remember whether a desired image was a still image or a video, for example, the user can quickly find the desired image based on the capture date and time, i.e., whether the image was taken some time ago or fairly recently.

Further, as will be described later, the MFP 1 according to this embodiment classifies the index images 21a, 21b, 21c, and 22 into groups for each capture date and outputs an image list 20 for each group. Thus, the MFP 1 may also print a capture date 23 for each group in a header portion of the corresponding image list 20, for example.

FIG. 4 conceptually illustrates the structure of the file data storage area 13h. As shown in FIG. 4, the file data storage area 13h includes a file ID storage area 201 storing file IDs, a file name storage area 202 storing filenames, a file type storage area 203 storing file types, a frame extraction number storage area 204 storing frame image extraction numbers, a total frame number storage area 205 storing total frame numbers, an fps data storage area 206 storing frames per second data (fps data), a file date data storage area 207 storing file date data, a file time data storage area 208 storing file time data, and an adjunctive file data storage area 209. File data records 200 are each configured of a filename, file type, frame extraction number, total frame number, fps data, file date data, file time data, and adjunctive file data and are stored in association with file IDs for managing the file data records 200. The MFP 1 creates a file data record 200 for each still image file and video file stored on the media card and stores the file data record 200 in the file data storage area 13h as a preparatory process for determining the layout order of the index images 21a, 21b, 21c, and 22 in the image list 20 (see FIG. 3).

The file ID storage area 201 is an address area storing a file ID. The file name storage area 202 is an address area storing the filename of a still image file or a video file. The file ID stored in the file ID storage area 201 is one-to-one correspondence with the file name stored in the file name storage area 202. As shown in FIG. 4, an extension is appended to each filename. Examples of extensions appended to filenames are "jpg" for JPEG image files, "avi" for AVI video files, and "mov" for QuickTime video files.

The file type storage area 203 is a memory area storing a value that indicates the type (format) of image file. The type of the image file can be determined from the extension appended to the filename, for example. In this embodiment, the value "0" is stored in the file type storage area 203 when the image file is in the JPEG file format (jpg extension), the value "1" is stored in the file type storage area 203 when the image file is in the AVI video file format (avi extension), and the value "2" is stored in the file type storage area 203 when the image file is in the QuickTime video file format (mov extension).

The MFP 1 can determine the type of image file based on data stored in a few bytes at the beginning of the image file. For example, if the first two bytes at the start of an image file are "0xFFD8," the MFP 1 can detect that the file is a JPEG file. If the first two bytes are "0x424D," the MFP 1 can detect that the file contains bitmap data. Hence, it is feasible to determine the type of image file based on this data.

The frame extraction number storage area 204 stores a value indicating the number of frame images for which corresponding frame image data is to be extracted from the image file (video file). A "1" is stored in the frame extraction number storage area 204 when the file is a still image file. A "2" or a larger value is stored in the frame extraction number storage area 204 when the file is a video file.

The total frame number storage area 205 stores the total number of frames in the corresponding image file. Hence, when the file is a video file, the total frame number storage area 205 stores the total number of frames in that video file. If the file is a still image file, then the total frame number storage area 205 always stores the value "1".

The fps data storage area 206 stores fps (frames per second) data for the image file. A "0" is stored in the fps data storage area 206 when the file is a still image file. However, in the case of a video file, the fps data storage area 206 may store a value such as "60" or "30" indicating that the video is played at a rate of 60 frames per second or 30 frame per second, respectively.

The file date data storage area 207 stores file date data representing the date that the image file was captured; for example, the capture date "Jan. 15, 2008" is represented with the file date data "20080115."

The file time data storage area 208 stores file time data indicating the time that the image file was captured; for example, the capture time "12:50:45," where "12" indicates the hour, "50" the minutes, and "45" the seconds, is expressed with the file time data "125045." If the image file is a video file, data indicating the start time for video capture is stored as the file time data.

In the following description, it will be assumed that the total frame number, fps data, file date data, and file time data are acquired by extracting data from the header of the image file, but this data may be acquired by other means.

The adjunctive file data storage area 209 stores other unique data for each image file.

The MFP 1 of this embodiment sets the layout order of the index images to an order corresponding to the capture date and time based on unique data for each image file stored in the file data storage area 13h. Data indicating this layout order is stored in the layout data storage area 13i shown in FIG. 5.

FIG. 5 conceptually illustrates the structure of the layout data storage area 13i. As shown in FIG. 5, the layout data storage area 13i stores layout data records 300, each including a file ID, group No., extracted frame number, image date data, image time data, and image characteristic data; and a layout order number associated with each layout data record 300.

Specifically, the layout data storage area 13i is provided with a layout order storage area 301, a file ID storage area 302, a group No. storage area 303, an extracted frame number storage area 304, an image date data storage area 305, an image time data storage area 306, and an image characteristic storage area 307.

The layout order storage area 301 stores layout order numbers. In the layout printing process described later with reference to FIGS. 10 and 11, the MFP 1 reads layout data records 300 in an order based on these layout order numbers and arranges index images in the image list 20 for frame images and still images identified by the layout data records 300 based on this layout order.

The file ID storage area 302 stores file IDs. Since a file ID is stored for each filename in the file data storage area 13h, as described above with reference to FIG. 4, each image file can be identified from the file ID.

The group No. storage area 303 stores group Nos. Group No. will be described later with reference to FIG. 6.

The extracted frame number storage area 304 stores frame extracted frame numbers. As described above, frame image data corresponding to a plurality of frame images is extracted from a single video file. Therefore, a value indicating an ordinal number (a sequence number) of one extracted frame image among all frame images as counted from the head of all frame images in the video file is stored in the extracted frame number storage area 304 as "extracted frame number".

An "extracted frame number" can be calculated according to the following equation 1, for example, using the total frame numbers in the video file stored in "the total frame number storage area 205", the frame extraction number stored in "the frame extraction number storage area 204" and counted value of the frame image number representing a sequence order of the frame image extracted from the plurality of frame images in the video file.

(extracted frame number)=[(counted value of frame image number−1)×(total frame number)/(frame extraction number)] [Equation 1]

Here, "[ ]" represents the Gaussian symbol, where [a] indicates the maximum integer not greater than a.

The image date data storage area 305 stores image date data expressing the day that the image file identified by the file ID stored in the file ID storage area 302 was captured. The image time data storage area 306 stores the image time data representing the time that the image file was captured. For still image files, the file time data stored in the corresponding memory area of the file data storage area 13h is copied to this image time data storage area 306.

On the other hand, since a plurality of sets of frame image data is extracted from a video file, the MFP 1 acquires image time data expressing the capture time of each frame image and stores these capture times in the image time data storage area 306. A detailed example of calculating image time data for each set of frame image data will be described later with reference to the flowchart in FIG. 7.

The image characteristic storage area 307 stores characteristic quantities for still images. The characteristic quantities stored in this embodiment for still images include the size and color calculated for each still image. Reference characteristic quantities described above are calculated from all characteristic quantities of the still images stored in the image characteristic storage area 307.

In the layout printing process described later with reference to FIGS. 10 and 11, the MFP 1 prints out the image list 20 in which the index images 21a, 21b, and 21c corresponding to frame images extracted from video files and the index images 22 corresponding to still image files are all the same size and have uniform color, and prints out the image list 20 with the index images laid out in an order based on the capture date and time.

The MFP 1 according to this embodiment also classifies index images into groups for each capture date and prints out an image list 20 for each classified group. For example, if the media card stores image files taken on Jan. 15, 2008 and image files taken on Jan. 20, 2008, the MFP 1 prints out one image list 20 including index images for the image files taken on Jan. 15, 2008 and another image list 20 including index images for the image files taken on Jan. 20, 2008.

Figure 6:
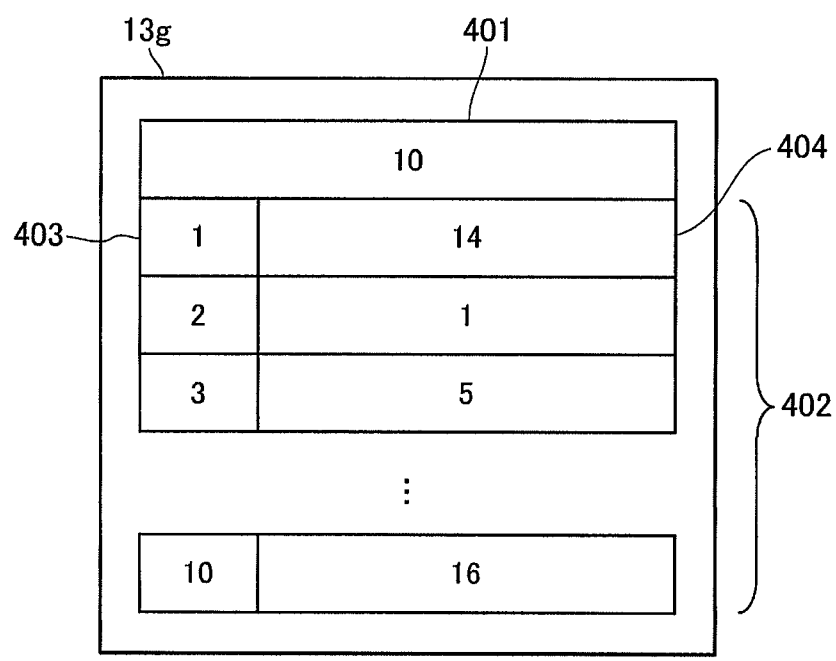
FIG. 6 shows a sample configuration of a group data storage area according to the first embodiment.

FIG. 6 shows a sample configuration of the group data storage area 13g. As shown in FIG. 6, the group data storage area 13g is provided with a total group number storage area 401, a unit group data storage area 402, and a group number storage area 403.

The total group number storage area 401 stores the number of groups generated in order to sort the index images. In the example shown in FIG. 6, ten groups have been generated to classify the index images.

The unit group data storage area 402 stores data for each group and includes the group number storage area 403 for storing a group number, and a group image number storage area 404 storing the number of index images classified in the group identified by the group number. In the example shown in FIG. 6, fourteen index images have been classified into the group with group number "1".

The MFP 1 according to this embodiment can provide the user with one image list 20 for each group, where each group includes index images generated from video files or still image files having the same capture date. By allowing the user to view an image list 20 for each group, the MFP 1 can provide image lists 20 that are easy to browse.

Next, a process performed on the MFP 1 according to the first embodiment to output an image list 20, such as that shown in FIG. 3A, will be described with reference to FIGS. 7 through 12. As a brief description of this process, in S100 the CPU 11 of the MFP 1 first executes a layout order setting process for setting the layout order of the index images. In S150 the CPU 11 executes a reference characteristic quantity calculation process to calculate reference characteristic quantities for correcting each index image. In S200 the MFP 1 executes a layout printing process for outputting the image list 20 including visually uniform index images arranged based on the layout order set in S100. Next, each process will be described in greater detail.

Figure 7:
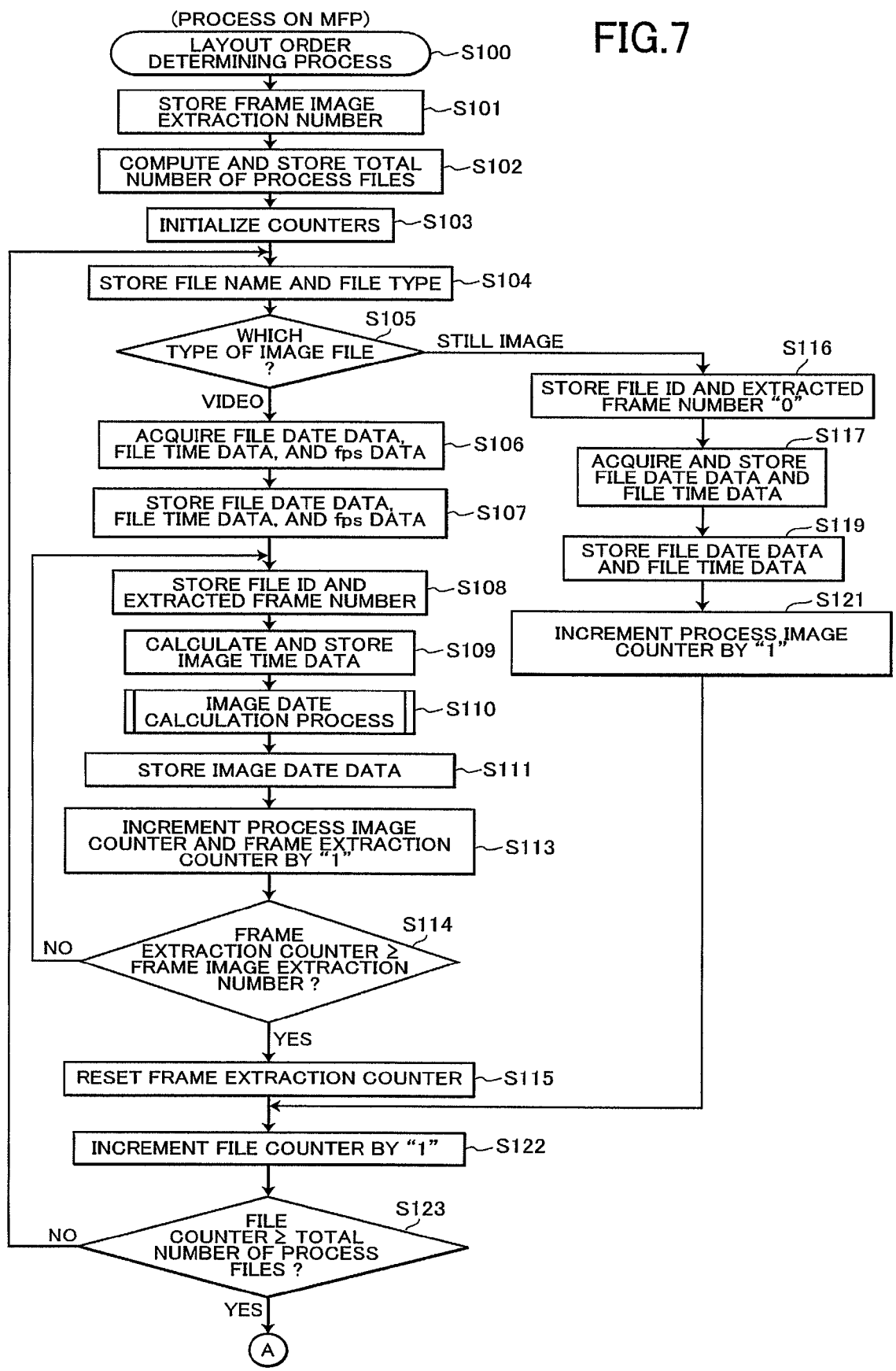
FIG. 7 is a flowchart illustrating steps in a layout order determining process executed on the MFP according to the first embodiment.

FIG. 7 is a flowchart illustrating steps in the layout order setting process of S100 executed by the MFP 1. The CPU 11 performs the layout order setting process of S100 shown in FIG. 7 when a media card is mounted in the slot section 6 and the user has inputted an instruction to print out image lists 20.

The layout order setting process of S100 is performed to acquire image date data and image time data indicating the capture dates and times the frame image data of the frame images extracted from one or more video files and the still images read from the media card, and to set a layout order for index images based on the acquired image date data and image time data.

In S101 at the beginning of the layout order setting process, the CPU 11 stores a value inputted by the user via the operating section 4 in the frame extraction number storage area 13a as "the frame image extraction number". In S102 the CPU 11 calculates "the total number of process files" denoting the total number of still image files and video files stored on the media card, and stores this value in the process file number storage area 13b.

In S103 the CPU 11 initializes each value of a file counter, a process image counter, a frame extraction counter, and a video file counter to "0". These counters are stored in the counter storage area 13m shown in FIG. 2.

Next, the CPU 11 selects a target image file, as a processing target file, from among the files stored on the media card and acquires the filename and file type of the target image file. In S104 the CPU 11 stores the acquired file name and a value corresponding to the acquired file type of the target image file in areas for the file ID corresponding to the current value of the file counter of the file name storage area 202 and the file type storage area 203, respectively.

In S105 the CPU 11 determines whether the type of the target image file selected in S104 is a video or a still image. If the CPU 11 determines that the file is a video file (S105: video), then the file type of the target image file is a video (S105: video), in S106 the file date data, the file time data and the fps data of the video file are acquired from the header of the video file.

Then, in S107 the acquired file date data, the acquired file time data, and the acquired fps data are stored in areas of the file ID corresponding to the current value of the file counter of the file date data storage area 207, the file time data storage area 208, and the fps data storage area 206, respectively.

Next, in S108 the current value of the file counter is stored, as file ID, in an area for the layout order number corresponding to the current value of the process image counter of the file ID storage area 302 in the layout data storage area 13i (see FIG. 5). Additionally, the extracted frame number is calculated based on the current value of the frame extraction counter (the counted value of frame image number) and stored an area for the layout order number corresponding to the current value of the process image counter of the extracted frame number storage area 304 in the layout data storage area 13i.

Subsequently, in S109 image time data of the frame image data for the extracted frame number calculated in S108 is calculated and the calculated image time data is stored an area for the layout order number, corresponding to the current value of the process image counter, of the image time data storage area 306 in the arrangement data storage area 13i. More specifically, in the following calculations, VideoTime is the file time data representing the capture start time of the video file, FPS is the frames per second data, FrameTime is the image time data representing the capture time of the frame image data, and N is the extracted frame number for identifying the frame image data to be processed.

Then, using Equations 2 below, the file time data Video-Time for the video file is dissolved into video hour data VT_Hour, video minute data VT_Minute and video second data VT_Second.

$$VT\_Hour=[VideoTime/10000]$$

$$VT\_Minute=[(VideoTime-VT\_Hour \times 10000)/100]$$

$$VT\_Second=VideoTime-(VT\_Hour \times 10000+VT\_Minute \times 100) \qquad \text{[Equations 2]}$$

Then, frame hour data Frame_Hour, frame minute data Frame_Minute and frame second data Frame_Second of the frame image data for the extracted frame number are calculated by the following Equations 3, where Cal_Second, Cal_Minute and Cal_Hour are temporary variables for achieving these calculations and A mod B represents the remainder after dividing A by B.

$$Cal\_Second = VT\_Second + [N/FPS]$$

$$Cal\_Minute = VT\_Minute + [Cal\_Second/60]$$

$$Cal\_Hour = VT\_Hour + [Cal\_Minute/60]$$

$$Frame\_Second = Cal\_Second \bmod 60$$

$$Frame\_Minute = Cal\_Minute \bmod 60$$

$$Frame\_Hour = Cal\_Hour \bmod 24 \quad \text{[Equations 3]}$$

The image time data FrameTime indicating the capture time of the frame image data can then be calculated by substituting the above results into Equation 4 below.

$$Frametime = Frame\_Hour \times 10000 + Frame\_Minute \times 100 + Frame\_Second \quad \text{[Equation 4]}$$

Similarly, if the file date data of the video file is VideoDate and the image date data of the frame image data to be processed is FrameDate, the VideoDate is dissolved into video year data VD_Year, video month data VD_Month and video day data VD_Day by using the following Equations 5.

$$VD\_Year = [VideoDate/10000]$$

$$VD\_Month = [(VideoDate - VD\_Year \times 10000)/100]$$

$$VD\_Day = VideoDate - (VD\_Year \times 10000 + VD\_Month \times 100) \quad \text{[Equations 5]}$$

Then, an image date calculation process is executed in S110. An image date calculation process is a process for calculating frame year data Frame_Year, frame month data Frame_Month and frame day data Frame_Day.

Figure 8:
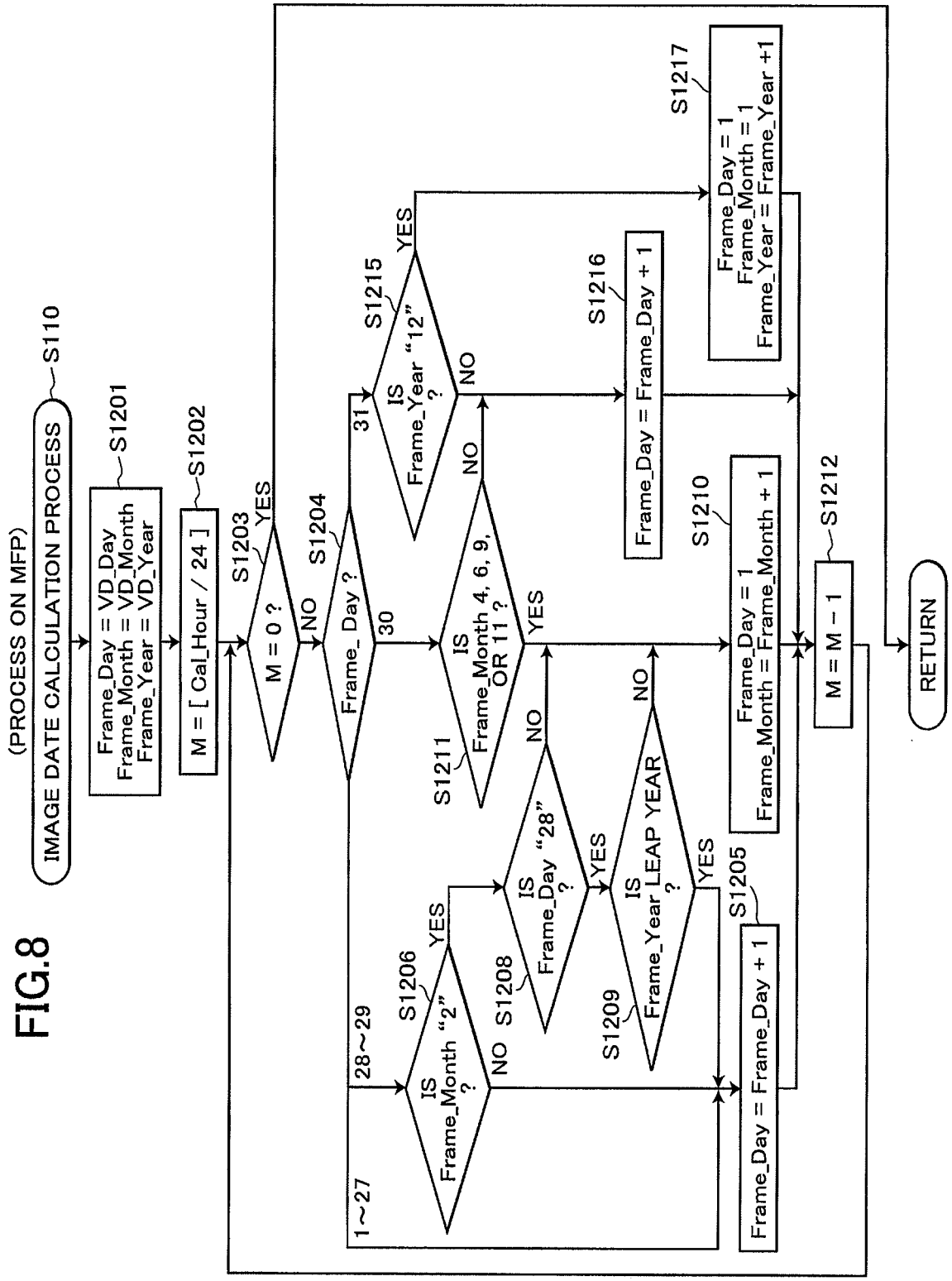
FIG. 8 is a flowchart illustrating steps in an image date calculation process according to the first embodiment.

FIG. 8 is a flowchart illustrating steps in the image date calculation process of S110. Note that a variable M in the flowchart of FIG. 8 denotes the number of days after the current date.

In S1201 of the image date calculation process, the CPU 11 sets the frame year data Frame_Year, the frame month data Frame_Month, and the frame day data Frame_Day to video year data VD_Year, video month data VD_Month, and video day data VD_Day, respectively. In S1202 the CPU 11 sets the variable M to the value Cal_Hour/24. In S1203 the CPU 11 determines the variable M is "0" or not. If the variable M is equal to "0" (S1203: Yes), the CPU 11 ends the current process.

However, if the variable M is not "0" (S1203: NO), in S1204 the CPU 11 determines date of the frame day data Frame_Day. If the date of the Frame_Day is between "1" and "27" (S1204: 1-27), in S1205 the CPU 11 increments Frame_Day by "1".

However, if the CPU 11 determines in S1204 that the date of the Frame_Day is "28" or "29" (S1204: 28 or 29), in S1206 the CPU 11 determines whether a value of the frame month data Frame_Month is "2". If Frame_Month is not "2" (S1206: NO), the CPU 11 advances to S1205.

However, if the Frame_Month is "2" (S1206: YES), in S1208 the CPU 11 determines whether the data of the Frame_Day is "28". If the date of the Frame_Day is not "28" (S1208: NO), then in S1210 the CPU 11 sets the date of the Frame_Day to "1" and increments Frame_Month by "1".

However, if the CPU 11 determines in S1208 that the date of the Frame_Day is "28" (S1208: YES), in S1209 the CPU 11 determines whether the year indicated by the frame year data Frame_Year is a leap year. If the year indicated by the Frame_Year is leap year (S1209: Yes), the CPU 11 advances to S1205. However, if the year indicated by the Frame_Year is not leap year (S1209: Yes), the CPU 11 advances to S1210.

If the CPU 11 determines in S1204 that the date of the Frame_Day is "30" (S1204: 30), in S1211 the CPU 11 determines whether the value of the Frame_Month is one of "4", "6", "9", or "11". If so (S1211: YES), the CPU 11 advances to S1210.

However, if the value of the Frame_Month is not one of "4", "6", "9", or "11" (S1211: NO), in S1216 the CPU 11 increments Frame_Day by "1". Further, if the CPU 11 determines in S1204 that the date of the Frame_Day is "31" (S1204: 31), in S1215 the CPU 11 determines whether the value of the Frame_Year is "12". If not (S1215: NO), the CPU 11 advances to S1216 described above.

However, if the value of the Frame_Year is "12" (S1215: YES), in S1217 the CPU 11 sets the date of the Frame_Day to "1", sets the value of the Frame_Month to "1", and increments the value of the Frame_Year by "1".

After performing any of the processes in S1205, S1210, S1216, and S1217, in S1212 the CPU 11 decrements the variable M by "1" and returns to S1203. When the CPU 11 determines in S1203 that the variable M is "0" (S1203: YES), the CPU 11 ends the image date calculation process.

Returning to FIG. 7, the CPU 11 substitutes the value found in the process of FIG. 8 in Equation 6 below, for example, to find image date data FrameDate representing the capture date of the frame image data. In S111 the CPU 11 stores this calculated image date data FrameDate in an area for the layout order number corresponding to the current value of the process image counter of the image date data storage area 305.

$$FrameDate = Frame\_Year \times 10000 + Frame\_Month \times 100 + Frame\_Day \quad \text{[Equation 6]}$$

In S113 the CPU 11 increments each of the process image counter and the frame extraction counter by "1".

In S114 the CPU 11 determines whether or not the value of the frame extraction counter is equal to or greater than the number of frame images to be extracted from the video file (the frame image extraction number) stored in the frame extraction number storage area 13a. If not (S114: NO), the CPU 11 returns to S108 and repeats the process (S108-S113) described above.

However, if the value of the frame extraction counter is greater than or equal to the frame image extraction number (S114: YES), then in S115 the CPU 11 resets the value of the frame extraction counter to "0" and in S122 increments the file counter by "1". In S123 the CPU 11 determines whether the current value of the file counter is greater than or equal to "the total number of process files" denoting the total number of still image files and video files stored on the media card. If not (S123: NO), the CPU 11 returns to S104, selects the next image file corresponding to the file ID equivalent to the file counter, and repeats the above steps (S104-S123). On the other hand, if the value of the file counter is equal to or greater than "the total number of process files" (S123: Yes), the CPU 11 advances to S124.

Next, the process performed by the CPU 11 when the CPU 11 determines in S105 that the targeted image file is a still image file (S105: still image) will be described. In the case of a still image file as well, in S116 the CPU 11 stores the current value of the file counter in an area for the layout order number corresponding to the current value of the process image counter of the file ID storage area 302 in the layout data storage area 13i. Further, in S116 the CPU 11 stores a "0" in an area for the layout order number corresponding to the current value of the process images counter of the extracted frame number storage area 304 in the layout data storage area 13i.

In S117 the CPU 11 acquires the file date data and the file time data of the still image file to be processed. Then, the CPU 11 stores the file date data in an area for the file ID corresponding to the current value of the file counter of the file date data storage area 207 in the file data storage area 13h, and the file time data in an area for the file ID corresponding to the current value of the file counter of the file time data storage area 208 in the file data storage area 13h. The CPU 11 stores "0" in the corresponding fps data storage area 206.

In S119 the CPU 11 copies the file date data and file time data of the for the targeted still image file from the file data storage area 13h to areas for the layout order number corresponding to the value of the process image counter of the image date data storage area 305 and the image time data storage area 306, respectively, of the layout data storage area 13i (see FIG. 5). Then, in S121 the value of the process image counter is incremented by "1" and the CPU 11 advances to S122.

After completing the process in S101-S123 described above, the CPU 11 has stored the file ID, the extracted frame number, the image date data, and the image time data in the layout data storage area 13i, but the layout order of the index images is not yet determined at this time. The index images are printed based on image data stored in the layout data storage area 13i and in the file data storage area 13h. The layout order of the index images are determined by sorting layout data records 300 according to the image date data and the image time data of the index images in the processes from S124 which will be described by referring to FIG. 9.

Figure 9:
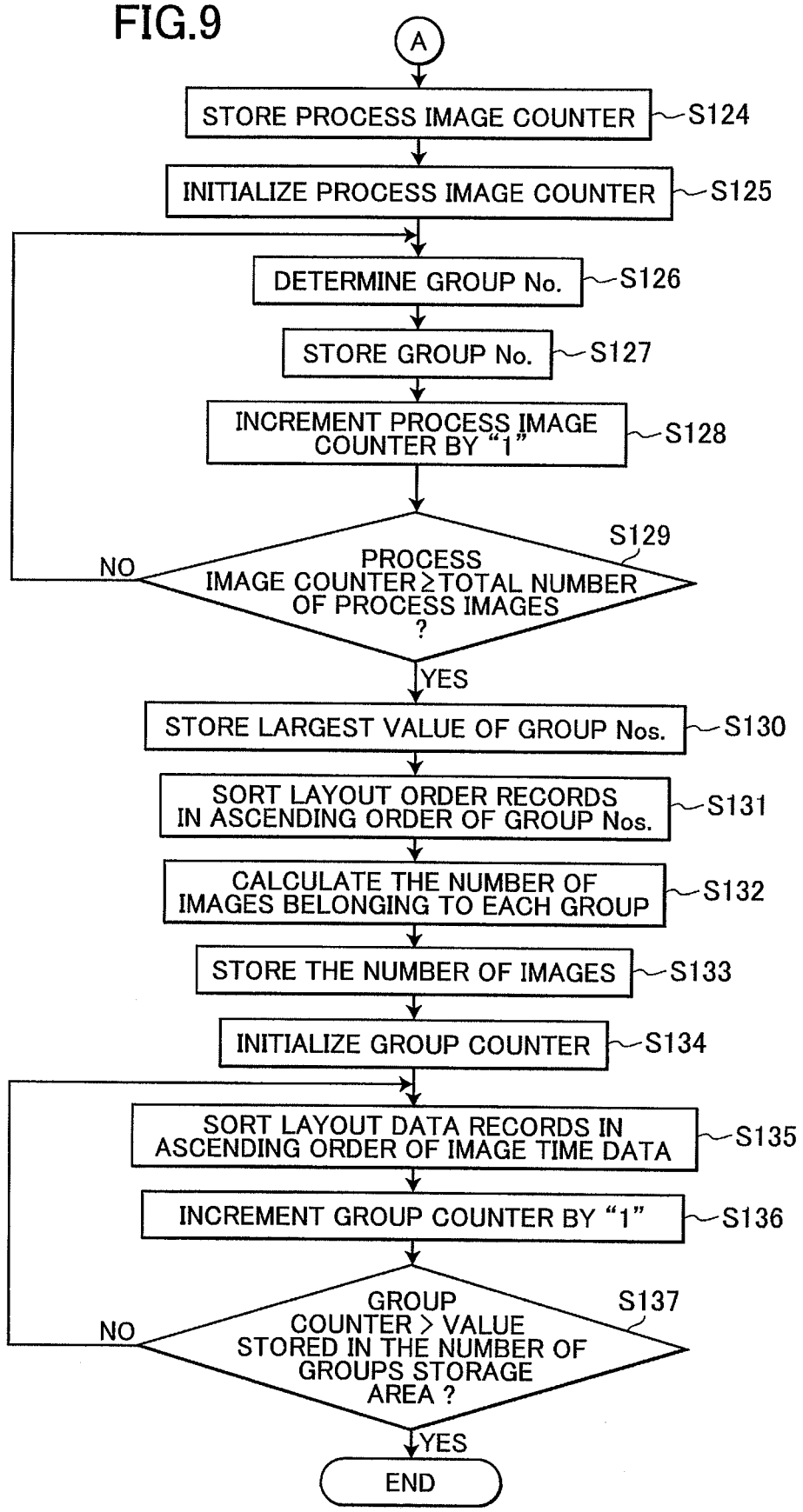
FIG. 9 is a flowchart illustrating continuing steps in the layout order determining process in FIG. 7.

In the continuation of the layout order setting process shown in FIG. 9, the CPU 11 classifies index images to be laid out in the image list 20 based on the image date data and sorts layout data stored in the layout data storage area 13i (see FIG. 5) according to a layout order based on the capture date and time.

In S124 of FIG. 9, the CPU 11 stores the current value of the process image counter in the total process image number storage area 13c shown in FIG. 2 as "the total number of process images". In S125 the CPU 11 initializes the process image counter to "0". The process image counter is stored in the counter storage area 13m shown in FIG. 2.

In S126 the CPU 11 sets the group No. based on the image date data stored in the image date data storage area 305 of the layout data storage area 13i shown in FIG. 5. Specifically, if the value (capture date) in the image date data storage area 305 associated with the layout order number equivalent to the current value of the process image counter is the same as the value (capture date) stored in the image date data storage area 305 that a group No. has been already allocated to the corresponding group No. storage area 303, the group No. is determined to be the group No. of the layout data record 300 that corresponds to the layout order number equivalent to the current value of the process image counter. If not, a new group No. is determined as the group No. of the layout data record 300. Here, the initial value of group No. is "1" and the new group No. is the group No. indicating the largest value (No.) so far+1.

In this way, index images corresponding to frame image data or still image files having the same capture date are classified into the same group, while index images corresponding to frame image data or still image files having different image capture dates are classified into different groups.

In S127 the determined group No. is stored at an area for the layout order number corresponding to the current value of the process image counter of the group No. storage area 303 (see FIG. 5). In S128 the CPU 11 increments the value of the process image counter by "1" and in S129 determines whether the current value of the process image counter is greater than or equal to the total number of process images stored in the total process image number storage area 13c. If not (S129: NO), the CPU 11 repeats the process from S126.

However, if the current value of the process image counter is greater than or equal to the total number of process images (S129: YES), in S130 the CPU 11 stores the largest value of the group No. in the total group number storage area 401 shown in FIG. 6. In S131 the CPU 11 sorts the layout data records 300 in order from smallest group number (in the ascending order of the group Nos.). Sorting layout data records in order of smallest group number can be accomplished with the quicksort or bubble sort algorithm, but the present invention is not particularly restricted to any sorting algorithm.

FIG. 5 conceptually illustrates the layout data storage area 13i when the layout data stored in the layout data storage area 13i has been sorted in order from smallest group number (in the ascending order of group Nos.).

Returning to FIG. 9, in S132 the CPU 11 calculates the number of index images belonging to the same group and in S133 stores the calculated number of index images in the group image number storage area 404 in association with the group No. In S134 the CPU 11 initializes a group counter to "1". The group counter is stored in the counter storage area 13m shown in FIG. 2.

In S135 the CPU 11 sorts the layout data records 300 in each group in the ascending order of image time data. The data is sorted separately for each group. Consequently, the layout order of index images that are identified by the layout data records 300 is determined.

In other words, the CPU 11 sets the layout order based on the image time data (image capture time data) for the index images classified in a same group. In the layout printing process of S200 described below, the MFP 1 prints out an image list 20 for each group, with index images within the same group arranged in order of smallest image time data. Accordingly, the user can acquire an image list that is easy to browse since the index images are arranged in order of their capture time, even when a single group includes a large number of index images.

Since it is preferable not to change the original layout order for images having the same image time data, a simple sorting algorithm, such as the bubble sort, is preferably used in S135.

In S136 the CPU 11 increments the value of the group counter by "1" and in S137 determines whether the current value of the group counter is greater than the value stored in the total group number storage area 401 shown in FIG. 6. If not (S137: NO), the CPU 11 returns to S135 and repeats the process (S135-S136) described above. When the CPU 11 determines that the current value of the group counter is greater than the value stored in the total group number storage area 401 (S137: YES), then the process has been completed for all groups and the CPU 11 ends the layout order setting process of S100.

Figure 10:
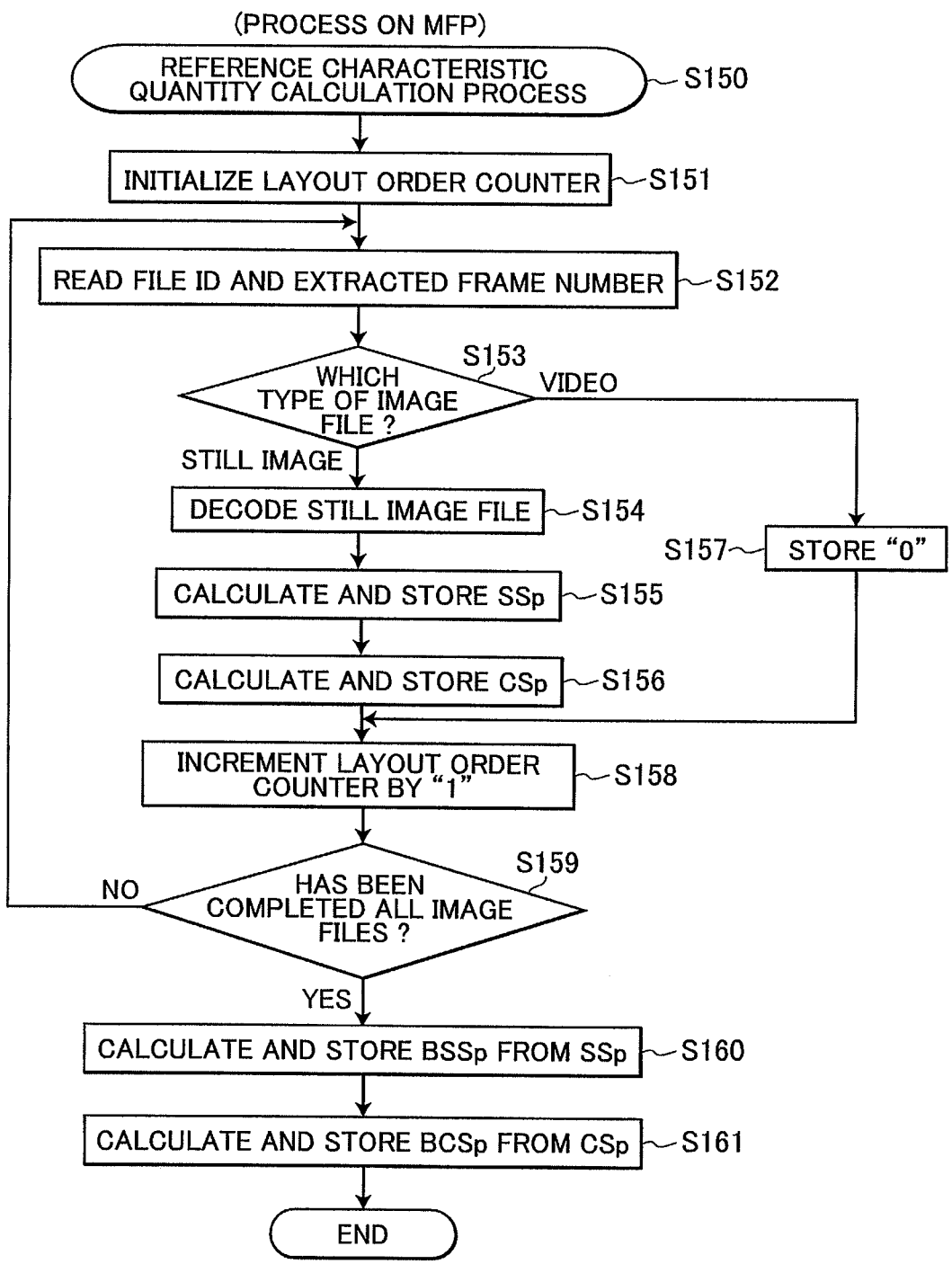
FIG. 10 is a flowchart illustrating steps in a reference characteristic quantity calculation process executed on the MFP according to the first embodiment.

FIG. 10 is a flowchart illustrating steps in the reference characteristic quantity calculation process of S150 executed on the MFP 1. The reference characteristic quantity calculation process shown in FIG. 10 is executed after the layout order setting process of S100 described above in order to calculate reference characteristic quantities from characteristic quantities in each still image for use as reference when correcting each index image. The characteristic quantity represents image characteristic of the still images, such as size and color of the still images.

In S151 at the beginning of the process in FIG. 10, the CPU 11 initializes the value of the layout order counter to "0". In S152 the CPU 11 reads the file ID and extracted frame number corresponding to the layout order number equivalent to the current value of the layout order counter from the layout data storage area 13i. In S153 the CPU 11 determines whether the image file corresponding to the file ID read in S152 is a video file or a still image file. Since this determination was already made previously in S105 described above, in S153 the MFP 1 simply reads the determination data from the file type storage area 203.

If the CPU 11 determines in S153 that the image file is a still image file (S153: still image), in S154 the CPU 11 performs a decoding process on the still image file.

In S155 the CPU 11 calculates an image characteristic quantity SSp for the size of the still image file and stores this image characteristic quantity SSp in an area for the layout order number corresponding to the current value of the layout order counter of the image characteristic storage area 307. Here, the image characteristic quantity SSp for size is configured of the image width, image height, and aspect ratio, where "width" is the number of pixels in the horizontal direction of the image, "height" is the number of pixels in the vertical direction of the image, and "aspect ratio" is calculated from height/width. In S155 all of these values are stored in the image characteristic storage area 307.

In S156 the CPU 11 calculates an image characteristic quantity CSp for the color of the still image file and stores this image characteristic quantity CSp in the area for the layout order number corresponding to the current value of the layout order counter of the image characteristic storage area 307. The image characteristic quantity CSp for color includes hue values (H_R, H_G, and H_B), a saturation value (S), and a lightness value (V) for each still image. The hue values are the average RGB values for pixels of the still image having brightness greater than a prescribed value in the RGB color space. The saturation value is the average saturation value of the still image in the HSV color space. The lightness value is the average lightness of the still image in the HSV color space. These values are all stored in the image characteristic storage area 307. Then, the CPU 11 advances to S158.

If the CPU 11 determines in S153 that the image file is a video file (S153: video), in S157 the CPU 11 stores a "0" in the corresponding image characteristic storage area 307 and subsequently advances to S158.

In S158 the CPU 11 increments the value of the layout order counter by "1", and in S159 determines whether the above process has been completed for all image files. If not (S159: NO), the CPU 11 repeats the above process from S152. If the process has been completed for all image files (S159: YES), the CPU 11 advances to S160.

In S160 the CPU 11 targets an image file whose value stored in the image characteristic storage area 307 is not "0", calculates a reference characteristic quantity BSSp from the image characteristic quantities SSp stored in the image characteristic storage area 307, and stores this reference characteristic quantity BSSp in the reference characteristic quantity storage area 13n.

The reference characteristic quantity BSSp is a characteristic quantity used as size reference for the image characteristic quantities SSp stored in the image characteristic storage area 307. Specifically, a reference characteristic quantity BWidth for the width of the image is set to the largest width among the image widths of the image characteristic quantities SSp; a reference characteristic quantity BAspectRatio for the aspect ratio of the image is set to the most frequent aspect ratio among the aspect ratios of the image characteristic quantities SSp; and a reference characteristic quantity BHeight for the height of the image is set to reference characteristic quantity BWidth/reference characteristic quantity BAspectRatio.

In this way, the reference characteristic quantity BSSp is determined from the image characteristic quantity SSp for each still image. The reference characteristic quantity BWidth and reference characteristic quantity BAspectRatio may be set to the average values of width and aspect ratio for all still images.

In S161 the CPU 11 targets an image file whose value stored in the image characteristic storage area 307 is not "0", calculates a reference characteristic quantity BCSp from the image characteristic quantities CSp for color stored in the image characteristic storage area 307, and stores this reference characteristic quantity BCSp in the reference characteristic quantity storage area 13n. Subsequently, the CPU 11 ends the reference characteristic quantity calculation process.

The reference characteristic quantity BCSp is a color reference for image characteristic quantities CSp for color stored in the image characteristic storage area 307. In this embodiment, a reference characteristic quantity BH_R for the hue value (H_R) is calculated as the average value of the hue values (H_R) of all still image; a reference characteristic quantity BH_G for the hue value (H_G) is calculated as the average value of the hue values (H_R) of all still image; a reference characteristic quantity BH_B for the hue value (H_B) is calculated as the average value of the hue values (H_B) of all still image; a reference characteristic quantity BS for saturation (S) is calculated as the average saturation value of the saturation values (S) of all still image; and a reference characteristic quantity BV for the lightness value (V) is calculated as the average lightness value of the lightness values (v) of all still image. All of these reference characteristic quantities are stored in the reference characteristic quantity storage area 13n.

In the following layout printing process of S200, the MFP 1 uses the reference characteristic quantity BSSp calculated in S160 and the reference characteristic quantity BCSp calculated in S161 to correct each index image to be printed out on a sheet of recording paper in order to achieve visual uniformity in the size and color of the index images.

Figure 11:
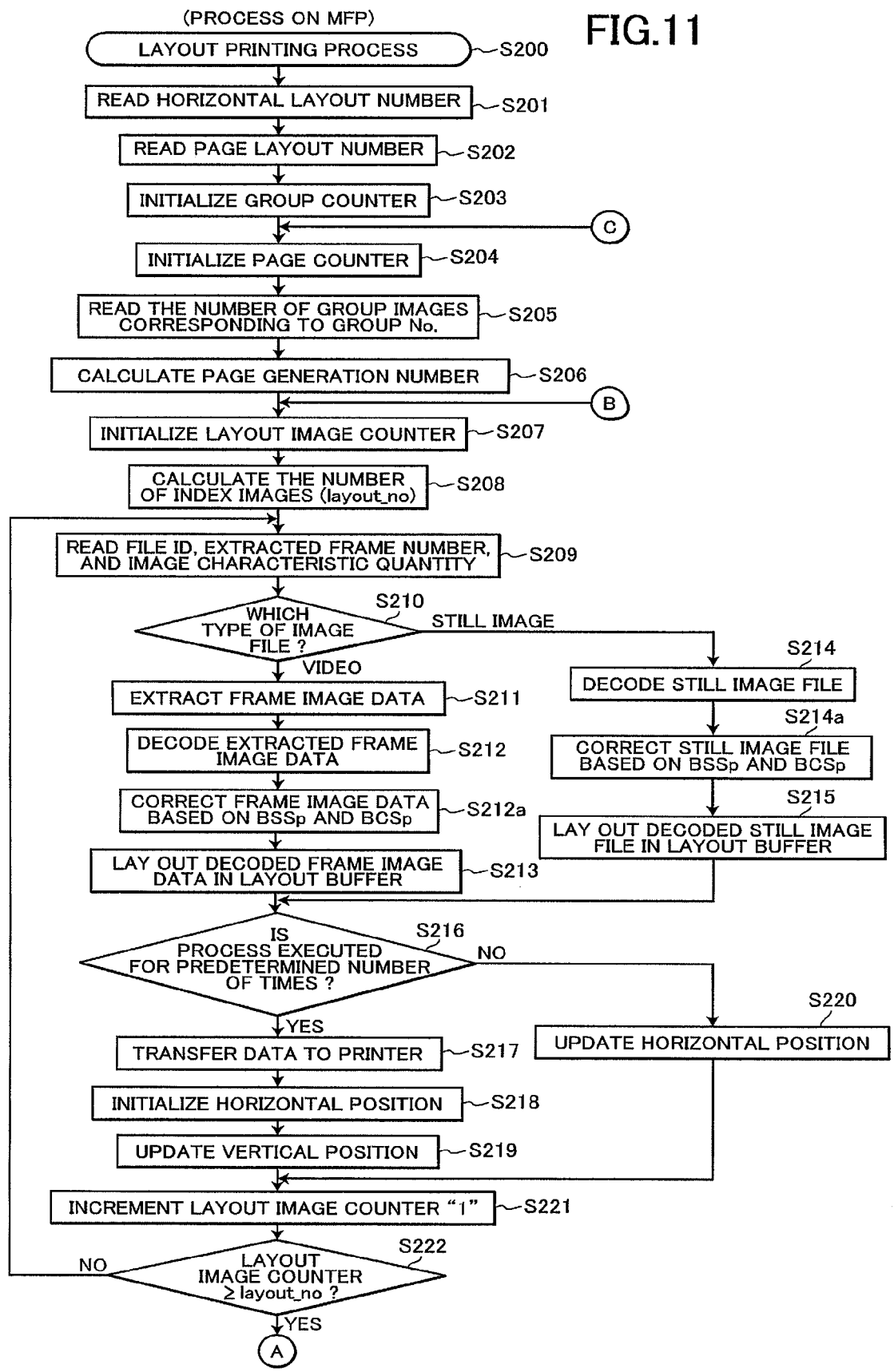
FIG. 11 is a flowchart illustrating steps in a layout printing process according to the first embodiment.

FIG. 11 is a flowchart illustrating steps in the layout printing process of S200. The CPU 11 executes the layout printing process of S200 after performing the layout order setting process of S100 described with reference to FIGS. 7 through 9 in order to print out the image list 20 on recording paper.

In S201 at the beginning of the layout printing process, the CPU 11 reads "the horizontal layout number" indicating the number of index images arranged in a row of the image list 20 from the horizontal image layout number storage area 12b. In S202 the CPU 11 reads "the page layout number" indicating the number of index images that can be laid out on a single page of the image list 20 from the page image layout number storage area 12c.

In S203 the CPU 11 initializes a group counter to "1". In the following process, this group counter functions to specify the group No. of the target group being processed. In S204 the CPU 11 initializes the page counter to "1". In the following process, this page counter functions to indicate which page of the image list 20 is the subject of processing for the target group. The page counter is stored in the counter storage area 13m shown in FIG. 2.

In S205 the CPU 11 reads the number of group images (index images) associated with the group No. indicated by the current value of the group counter from the group image number storage area 404. In other words, the CPU 11 acquires the number of index images belonging to the group indicated by the group No. as a result of classification. In S206 the CPU 11 calculates "a page generation number" indicating the number of pages of the image list 20 to print out for the targeted group based on "the number of group images" read in S205 and "the page layout number," and stores this page generation number in the page generation number storage area 13d shown in FIG. 2. In this embodiment, "the page generation number" is calculated using Equation 7 below, for example.

(Page generation number)=[(number of group image)/(page layout number)]+1  [Equation 7]

In S207 the CPU 11 initializes a layout image counter to "0" and in S208 calculates an image number layout_no indicating the number of index images to be laid out on one sheet of recording paper. In this embodiment, the image number layout_no is calculated according to Equation 8 below.

When (value of page counter)<page generation number, layout_no=(page layout number)

When (value of page counter)≥page generation number, layout_no=(group image number)−{(page layout number)×(value of page counter−1)}  [Equation 8]

In S209 the CPU 11 reads the file ID, extracted frame number, and image characteristic quantity corresponding to the layout order number equivalent to the current value of the layout order counter from the layout data storage area 13i. In S210 the CPU 11 determines whether the image file corresponding to the file ID read in S209 is a video file or a still image file.

If the CPU 11 determines that the image file is a video file (S210: video), in S211 the CPU 11 extracts the frame image data for one frame identified by the above extracted frame number from the video file.

In S212 the CPU 11 performs a decoding process on the extracted frame image data and stores the decoded data in the decoded data storage area 13k. In S212a the CPU 11 corrects characteristic quantities of the frame image data to match the reference characteristic quantity BSSp and reference characteristic quantity BCSP stored in the reference characteristic quantity storage area 13n in S160 and S161 of FIG. 10. In other words, the CPU 11 conforms the characteristic quantities of the frame image data to the reference characteristic quantity BSSp and reference characteristic quantity BCSp. More specifically, correction is performed in the order of an enlarging/reducing process, a trimming process, a hue conversion process, a lightness conversion process, and a saturation conversion process.

Hence, an enlarging/reducing process is performed first in S212a. In this process, a value SizeRate to be used as the enlarging/reducing ratio is calculated according to the following equations.

$$SizeRate = \frac{BHeight}{Height} (BAspectRatio < AspectRatio) \quad [\text{Equation 9}]$$

$$SizeRate = \frac{BWidth}{Width} (BAspectRatio \geq AspectRatio) \quad [\text{Equation 10}]$$

The CPU 11 then enlarges or reduces a frame image of the targeted frame image data based on the enlarging/reducing ratio SizeRate calculated above. This enlarging or reducing process can be performed using a bilinear or bicubic interpolation algorithm, for example. Next, variables Width' and Height' are set to the width and height of the new frame image (enlarged/reduced frame image).

The trimming process is performed next. The trimming process is performed to adjust the Width' and Height' of the newly sized frame image to the reference characteristic quantity BWidth and reference characteristic quantity BHeight. The CPU 11 can obtain a trimmed image data using Equation 11 below, where O(x, y) indicates the frame image prior to trimming, P(x, y) indicates the frame image after trimming, and x and y are coordinates.

$$P(x, y) = O\left(x + \frac{BWidth - Width'}{2}, y + \frac{BHeight - Height'}{2}\right) \quad [\text{Equation 11}]$$

By performing the enlarging/reducing process and the trimming process described above, the CPU 11 can match the frame image data to the reference characteristic quantity BSSp, thereby achieving a uniform size for the index image associated with each set of frame image data.

Next, the CPU 11 performs the hue conversion process. In this process, the CPU 11 uses the following equations to find converted pixel values O'(x, y)R, O'(x, y)G, and O'(x, y)B from the pre-converted values O(x, y)R, O(x, y)G, and O(x, y)B for each pixel value of the target frame image O in the RGB color space, where x and y are coordinates of the image. Further, AveV is the average lightness value (V) for the entire image corresponding to the target frame image data.

$$O'(x,y)R = O(x,y)R + H\_R \times AveV \div BV$$

$$O'(x,y)G = O(x,y)G + H\_G \times AveV \div BV$$

$$O'(x,y)B = O(x,y)B + H\_B \times AveV \div BV \quad [\text{Equation 12}]$$

The CPU 11 performs the lightness conversion process next. In this process, the CPU 11 converts pixel values O'(x, y)R, O'(x, y)G, and O'(x, b) obtained from the color conversion process described above to pixel values O'(x, y)H, O'(x, y)S, and O'(x, y)V in the HSV color space.

Next, the CPU 11 corrects lightness in the pixel values O'(x, y)H, O'(x, y)S, and O'(x, y)V in the HSV color space using the equations below to obtain pixel values O''(x, y)H, O''(x, y)S, and O''(x, y)V.

$$O''(x,y)H = O'(x,y)H$$

$$O''(x,y)S = O'(x,y)S$$

$$O''(x,y)V = O'(x,y)V \times BV \div AveV \quad [\text{Equation 13}]$$

Lastly, the CPU 11 performs the saturation conversion process. In this process, the CPU 11 uses the following equations to convert saturation in the pixel values O''(x, y)H, O''(x, y)S, and O''(x, y)V produced from the lightness conversion process to obtain pixel values O'''(x, y)H, O'''(x, y)S, and O'''(x, y)V. In the following equations, AveS is the average saturation value (S) for the entire image corresponding to the target frame image data.

$$O'''(x,y)H = O''(x,y)H$$

$$O'''(x,y)S = O''(x,y)S \times BS \div AveS$$

$$O'''(x,y)V = O''(x,y)V \quad [\text{Equation 14}]$$

Performing the above conversion processes for hue, lightness, and saturation, the CPU 11 can match the characteristics of the frame image data to the reference characteristic quantity BCSp, thereby achieving a uniformity of color in the index image corresponding to each set of frame image data.

In S213 the CPU 11 lays out the frame image data corrected in S212a at a prescribed position in a layout buffer provided in the RAM 13 shown in FIG. 2.

However, if the CPU 11 determines that the image file is a still image file (S210: still image), in S214 the CPU 11 performs a decoding process on the still image file identified by the file ID corresponding to the layout order number and stores the decoded data in the decoded data storage area 13k. In S214a the CPU 11 corrects the still image file using the reference characteristic quantity BSSp and reference characteristic quantity BCSp stored in the reference characteristic quantity storage area 13n according to the same method described in S212a. Through the correction performed in S214a, the CPU 11 can match size and color of the still image file to the reference characteristic quantity BSSp and reference characteristic quantity BCSp, thereby achieving a uniformity of size and color in the index image corresponding to each still image file and further achieving a uniformity of size and color among both frame image data and still image files.

In S215 the CPU 11 lays out the still image file corrected in S214a at a prescribed position in the layout buffer provided in the RAM 13.

After performing the above process to layout either corrected frame image data or a corrected still image file in the layout buffer, in S216 the CPU 11 determines whether the layout process has been performed a number of times equivalent to "the horizontal layout number", which is the upper limit of the number of images that can be laid out in a row. If not (S216: NO), in S220 the CPU 11 updates a horizontal position indicating the next layout position for data in the buffer. Hence, the next image is laid out the updated horizontal position in the layout buffer.

In S221 the CPU 11 increments the value of the layout image counter by "1" and in S222 determines whether the value of the layout image counter is greater than or equal to the image number layout_no of the index images to be arranged on the current sheet of recording paper. If not (S222: NO), the CPU 11 returns to S209 and processes layout data corresponding to the next layout order number.

By repeatedly performing the above process, the MFP 1 extracts frame image data for a number of frame images equivalent to the frame extraction number from each video file stored on the media card and lays out the frame image index data in the layout buffer. At the same time, the MFP 1 extracts still image files stored on the media card and lays out the still image index data in the layout buffer.

When the above layout process has been executed a number of times equivalent to "the horizontal layout number" (S216: YES), in S217 the CPU 11 transfers data from the layout buffer to the printer 3 shown in FIG. 2. Hence, the MFP 1 provides data corresponding to one row worth of index images in the layout buffer to the printer 3 so that the printer 3 can perform a printing process to output the image list 20.

In S218 the CPU 11 initializes the horizontal position indicating the horizontal layout position in the layout buffer for the next target index image and in S219 updates a vertical position indicating the vertical layout position in the layout buffer for the next target index image. Based on the horizontal layout position and vertical layout position, the CPU 11 sets the layout position for the next data in the layout buffer so that the next index images are arranged in the next row of the image list 20 beginning from the left end thereof. Subsequently, the CPU 11 executes the processes in S221 and S222 described above.

After completing the above process for all index images, i.e., when the layout image counter is greater than or equal to the image number layout_no (S222: YES), the CPU 11 advances to S223 of FIG. 12.

Figure 12:
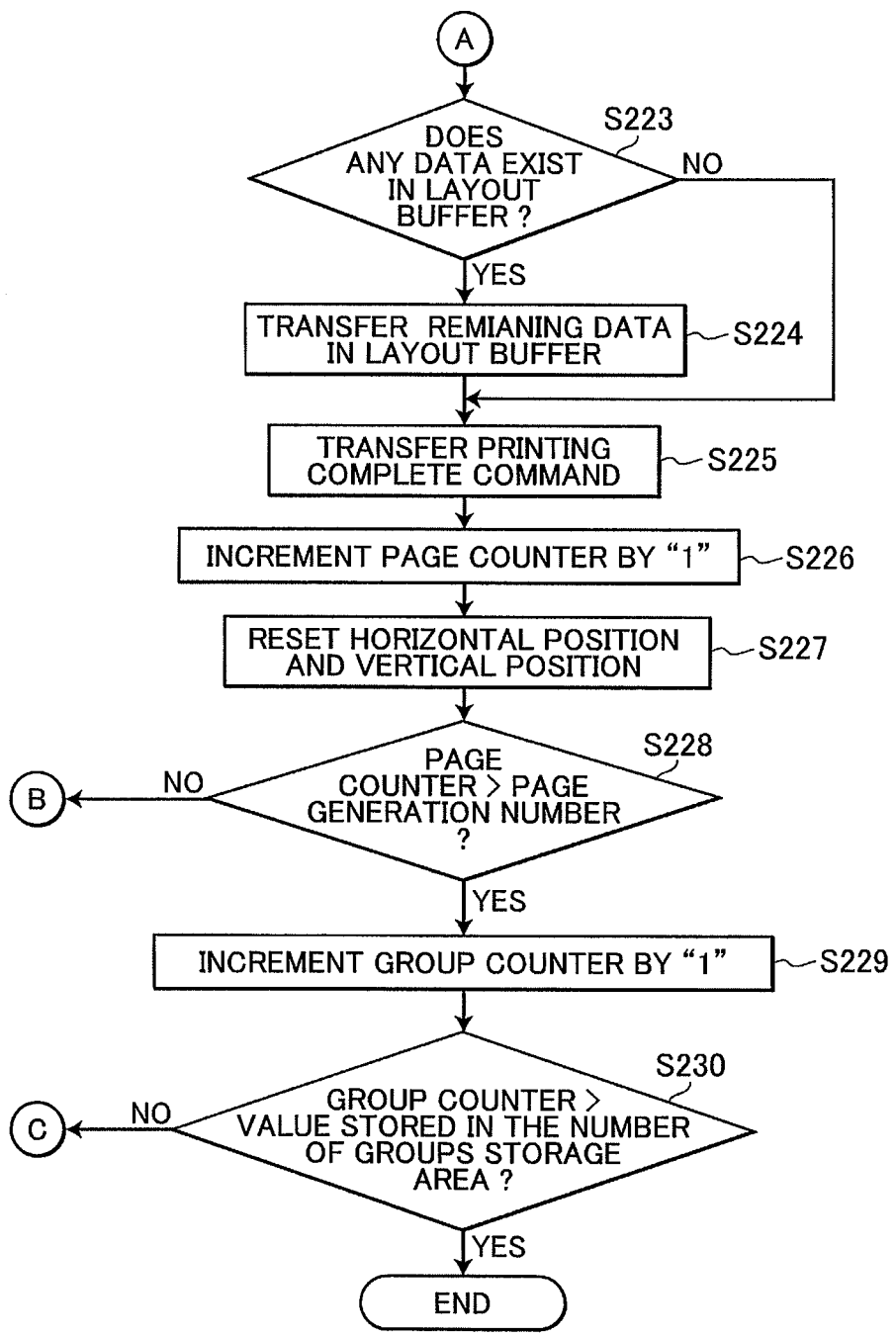
FIG. 12 is a flowchart illustrating continuing steps in the layout printing process of FIG. 10.

FIG. 12 is a flowchart illustrating continuing steps in the layout printing process of FIG. 11. The steps in FIG. 12 are executed after a YES determination is made in S222 of FIG. 11.

In S223 of FIG. 12, the CPU 11 determines whether any data that are not subjected to a printing process exists in the layout buffer. If so (S223: YES), in S224 the CPU 11 transfers the remaining data in the layout buffer to the printer 3 for printing and subsequently advances to S225. Here, data is not printed for areas in the layout buffer in which no images were arranged. However, if any data does not exist in the layout buffer (S223: NO), the CPU 11 skips S224 and advances directly to S225.

In S225 the CPU 11 transfers a print complete command to the printer 3 indicating that the output of one page worth of data is complete. In S226 the CPU 11 increments the value of the page counter by "1". In S227 the CPU 11 resets the horizontal position and vertical position indicating the layout position in the layout buffer for the next data (next index image). In S228 the CPU 11 determines whether the current value of the page counter is greater than "the page generation number" indicating the number of pages of the image list 20 to print out for the current target group. If not (S228: NO), the CPU 11 returns to S207 of FIG. 11 and begins processing the next page for the same group.

However, if the current value of the page counter is greater than "the page generation number" (S228: YES), in S229 the CPU 11 increments the value of the group counter by "1". In S230 the CPU 11 determines whether the current value of the group counter is greater than the value stored in the group number storage area 401. If not (S230: NO), the CPU 11 returns to S204 and repeats the process described above. Hence, the CPU 11 repeats the above process targeting the group identified by the next group No.

However, if the current value of the group counter is greater than the value stored in the group number storage area 401 (S230: YES), the CPU 11 ends the layout printing process of S200.

Therefore, when the MFP 1 of this embodiment is printing out the image list 20 that includes a combination of index images 21a, 21b, and 21c corresponding to frame images extracted from video files and index images 22 corresponding to still image files, as described with reference to FIG. 3A, the MFP 1 first corrects the sizes of the index images 21a, 21b, 21c, and 22 to match the reference characteristic quantity BSSp and corrects the color of the index images 21a, 21b, 21c, and 22 to match the reference characteristic quantity BCSp. Accordingly, the MFP 1 can output the image list 20 having visual uniformity among the index images 21a, 21b, 21c, and 22. In addition, the MFP 1 can output an image list 20 with index images arranged in a layout order based on file time data (i.e., the capture time of the still image file or frame image data).

Next, the MFP 1 according to the second embodiment of the present invention will be described with reference to FIGS. 13A through 18. The MFP 1 according to the first embodiment corrects sizes and color of the index images 21a, 21b, 21c, and 22 based on the reference characteristic quantity BSSp and BCSp in order to output the image list 20 having visual uniformity among the index images 21a, 21b, 21c, and 22.

On the other hand, the MFP 1 according to the second embodiment corrects lightness of the index images based on a group color correction parameter (average lightness value) described later in order to output an image list having visual uniformity among the index images.

Note that the external configuration and the electrical configuration of the MFP 1 according to the second embodiment are identical to those of the MFP 1 according to the first embodiment. However, the MFP 1 according to the second embodiment does not employ the reference characteristic quantity storage area 13n.

The components of the MFP 1 according to the second embodiment that are identical to those of the MFP 1 according to the first embodiment are denoted by the same reference symbols and only the part of the MFP 1 according to the second embodiment that differs from the first embodiment will be described below.

FIG. 13A shows an example of an image list 120 that the MFP 1 according to the second embodiment prints out on one sheet of a recording paper. When still image files and video files are combined on a media card, the MFP 1 outputs the image list 120 having a combination of index images 24a, 24b, and 24c corresponding to frame image data extracted from one or more video files and index images 25 corresponding to still image files, as shown in FIG. 13A. Accordingly, the user can perceive that the index images 24a, 24b, and 24c indicate content of video files and that the index images 25 indicate content of still image files at a glance when viewing a single page of the image list 120, making browsing more user-friendly.

FIG. 13B, on the other hand, shows an image list 220 printed out on one sheet of recording paper by a device different from the MFP 1 according to the present invention. Both image lists 120 and 220 in FIGS. 13A and 13B include sets of index images 24a, 24b, and 24c, each set corresponding to frame images extracted from the same video files, and index images 25 corresponding to same still image files and are printed out on one page of recording paper.

Therefore, like the image list 120 shown in FIG. 13A, the image list 220 shown in FIG. 13B includes four index images 24a corresponding to frame images extracted from a first video file, two index images 24b corresponding to frame images extracted from a second video file, three index images 24c corresponding to frame images extracted from a third video file, and three index images 25 corresponding to three still image files.

However, in the image list 220 shown in FIG. 13B, there is no uniformity of color among the index images 24a, 24b, and 24c corresponding to frame images extracted from video files and the index images 22 corresponding to still image files (hatching and dot patterns in the index images 24a, 24b, and 24c shown in FIG. 13B indicate that each of the index images 24a, 24b, and 24c has a different color cast). Some of the image have a yellowish color cast, while others have a bluish color cast due to differences in light sources among still images taken in the morning, video taken in the evening, and still images taken indoors, for example, detracting from the appearance of the image list 100.

In the image list 120 shown in FIG. 13A, on the other hand, the index images 24a, 24b, and 24c corresponding to frame images extracted from video files and the index images 25 corresponding to still image files have been rendered in the same colors. Specifically, the MFP 1 according to the second embodiment can output an image list 120 that maintains a visual uniformity among colors possessed by the index images 24a, 24b, 24c, and 25.

The structure of the file data storage area 13h according to the second embodiment is identical to the structure of the file data storage area 13h according to the second embodiment. Hence, detailed description of the file data storage area 13h is omitted.

FIG. 14 conceptually illustrates the structure of the layout data storage area 13i according to the second embodiment. As shown in FIG. 14, the layout data storage area 13i according to the second embodiment includes an image color correction parameter storage area 308 and a group image number storage area 309 instead of the image characteristic storage area 307 of the layout data storage area 13i according to the first embodiment. The image color correction parameter storage area 308 stores image color correction parameters. These parameters are average lightness values indicating the color (lightness) of each index image in the image list 120 shown in FIG. 13A prior to correction. The group image number storage area 309 stores image numbers in each groups. The remaining areas 301-306 of the layout data storage area 13i according to the second embodiment are identical to those of the layout data storage area 13i according to the first embodiment.

Figure 15:
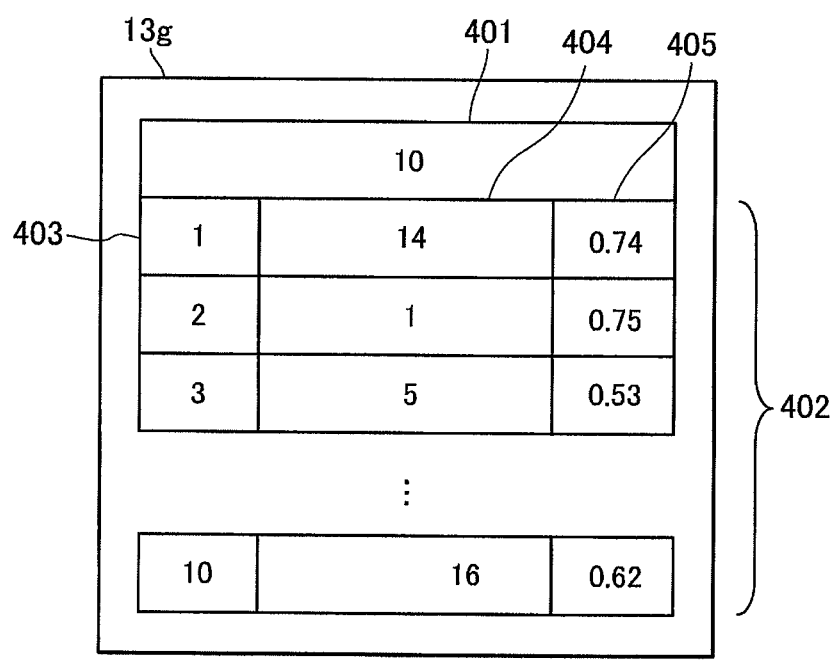
FIG. 15 shows a sample configuration of a group data storage area according to the second embodiment.

FIG. 15 shows a sample configuration of the group data storage area 13g according to the second embodiment. As shown in FIG. 15, the group data storage area 13g includes a group color correction parameter storage area 405 in addition to the areas 401-404 that are identical to those of the group data storage area 13g according to the first embodiment. In the example shown in FIG. 15, a group color correction parameter of the group with the group number "1" is 0.74.

Figure 16:
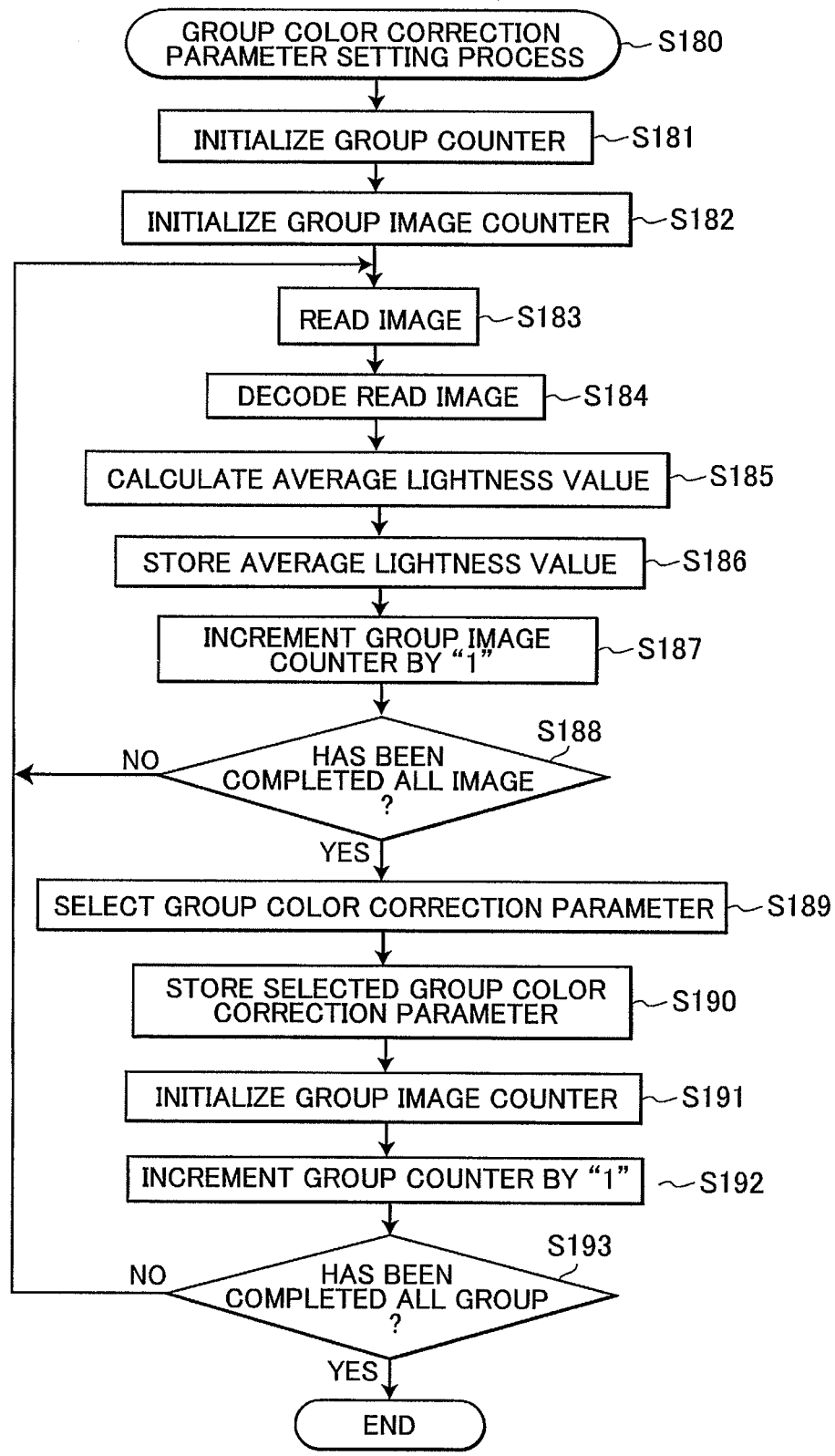
FIG. 16 is a flowchart illustrating steps in a group color correction parameter setting process executed on the MFP according to the second embodiment.

Next, a process performed on the MFP 1 according to the second embodiment to output the image list 120 shown in FIG. 13A will be described with reference to FIGS. 16 through 18. A layout order setting process according to the second embodiment for setting the layout order of the index images is identical to the layout order setting process of S100 shown in FIG. 7 through 9 according to the first embodiment. Hence, the detailed description of the layout order setting process according to the second embodiment is omitted.

In the second embodiment, the MFP 1 executes a group color correction parameter setting process of S180 instead of the reference characteristic quantity calculation process of S150 according to the first embodiment. FIG. 16 is a flowchart illustrating steps in the group color correction parameter setting process of S180 executed by the MFP 1. The MFP 1 executes the process of S180 after the layout order setting process of S100 described above. In this process, the CPU 11 of the MFP 1 according to the second embodiment sets a group color correction parameter for correcting each image within a group to achieve a uniformity of color (lightness) among index images belonging to the same group.

In S181 the CPU 11 initializes the group counter to "1". The group counter is stored in the counter storage area 13m and functions to specify the group No. of the target group. In S182 the CPU 11 initializes a group image counter to "1". The group image counter is also stored in the counter storage area 13m and functions to indicate the target group image number in each group stored in the unit group data storage area 402.

In S183 the CPU 11 reads an image corresponding to current values of the group counter and group image counter based on the file data storage area 13h and the layout data storage area 13i, in S184 performs a decoding process on the image read in S183, and in S185 calculates an average lightness value for the decoded image. When the image is defined in RGB values, the CPU 11 can calculate the average lightness value by converting the RGB values to HSV values and finding the average V value. Here, HSV stands for hue (H), saturation (S), and lightness (V). In S186 the CPU 11 stores the average lightness value in an area corresponding to the current values of the group counter and group image counter in the image color correction parameter storage area 308 as the image color correction parameter.

In S187 the CPU 11 increments the group image counter by "1" and in S188 determines whether the above process has been performed on all images of the target group corresponding to the current value of the group counter. While there remain images that have not been processed (S188: NO), the CPU 11 repeats the process from S183.

However, when the above process has been completed for all images within the target group (S188: YES), in S189 the CPU 11 selects one group color correction parameter from the group color correction parameters, that are stored in the image color correction parameter storage area 308, for the target group corresponding to the group counter. For example, the CPU 11 selects an image color correction parameter that is a median value among all parameters stored in the image color correction parameter storage area 308 for each image in S186, and sets a group color correction parameter Col to the selected image color correction parameter. If one group has an even number of the image color correction parameters, the larger value between two candidate median values is selected as a median value. In S190 the CPU 11 stores the group color correction parameter Col in an area for the group No. corresponding to the current value of the group counter of the group color correction parameter storage area 405.

In S191 the CPU 11 initializes the group image counter to "1". In S192 the CPU 11 increments the group counter by "1" and in S193 determines whether the above process has been performed for all groups. If so (S193: YES), the CPU 11 ends the group color correction parameter setting process. However, if there remain groups to be processed (S193: NO), the CPU 11 repeats the process described above from S183.

By performing the group color correction parameter setting process described above, the CPU 11 can set the same group color correction parameter Col for all images belonging to the same group (images having the same capture date). In the layout printing process of S200 described later, the CPU 11 reads this group color correction parameter Col and performs color correction on all images within a group to match the image color correction parameter (average lightness value) of each image to the group color correction parameter Col.

Subsequently, the CPU 11 performs a layout printing process of S300 shown in FIGS. 17 and 18. FIGS. 17 and 18 are flowcharts illustrating steps in the layout printing process of S300 that the MFP 1 according to the second embodiment executes. This layout printing process of S300 is executed instead of the layout printing process of S200 in the first embodiment. Note that the steps in the flowcharts of FIGS. 17 and 18 that are identical to their counterparts in the flowchart of the layout printing process of S200 that the MFP 1 according to the first embodiment executes are denoted respectively by the same reference symbols and will not be described here any further.

Figure 17:
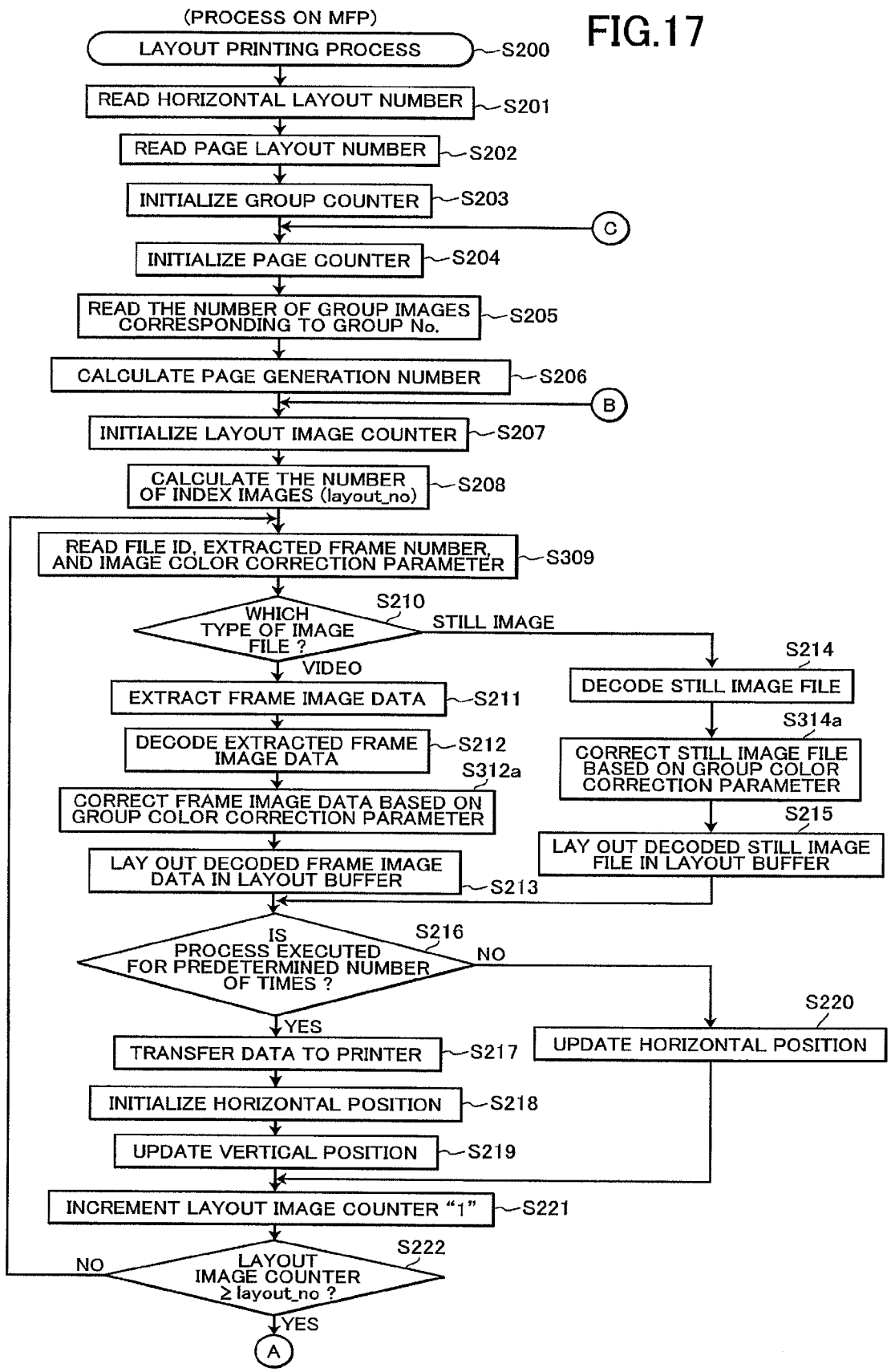
FIG. 17 is a flowchart illustrating steps in a layout printing process according to the second embodiment.
Figure 18:
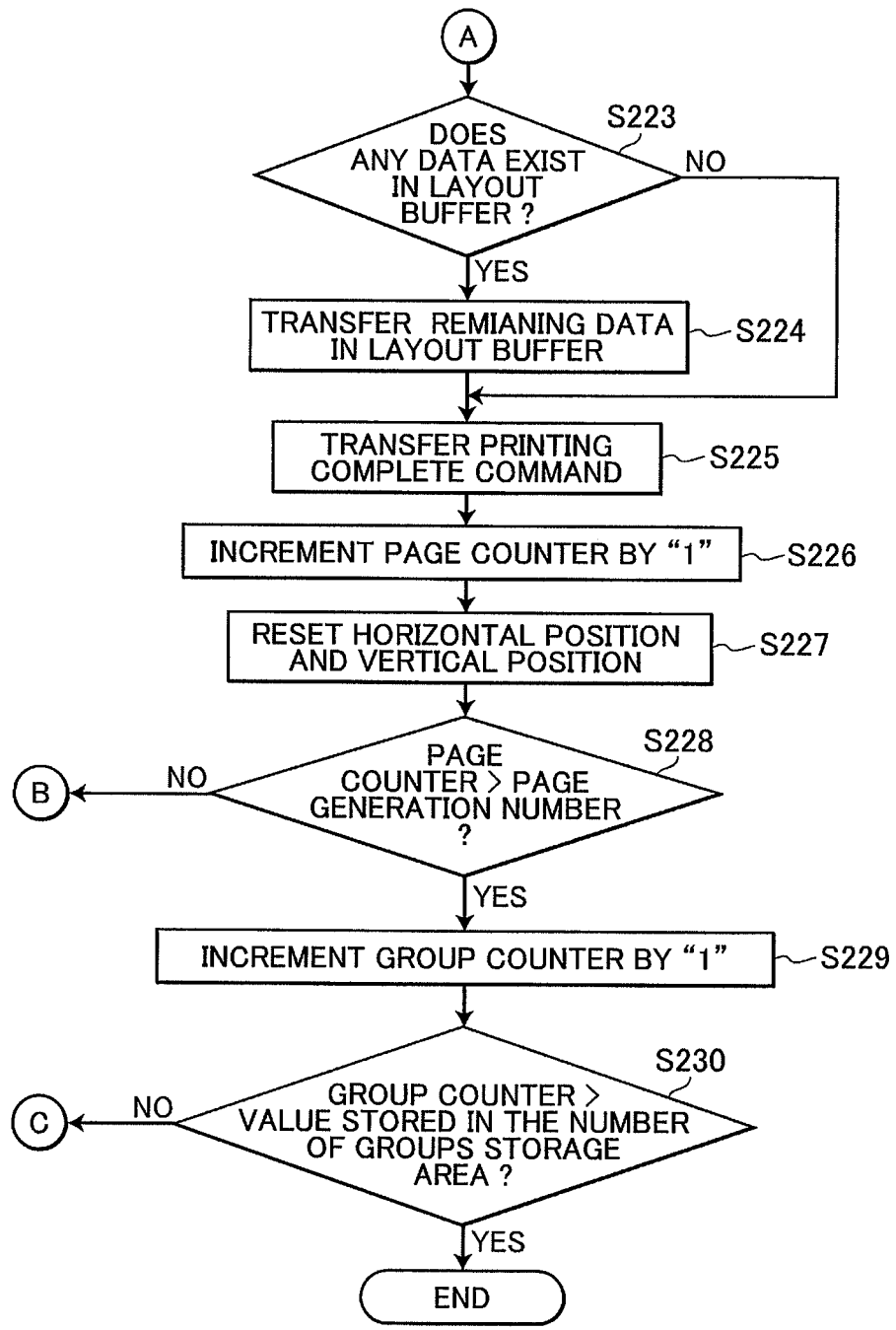
FIG. 18 is a flowchart illustrating continuing steps in the layout printing process of FIG. 17.

Referring to FIG. 17, in the layout printing process of S300 in the second embodiment, in S309 the CPU 11 reads the file ID, extracted frame number, and image color correction parameter corresponding to the layout order number equivalent to the current value of the layout order counter from the layout data storage area 13i after performing S201-S208. In S210 the CPU 11 determines whether the image file corresponding to the file ID read in S309 is a video file or a still image file.

If the CPU 11 determines that the image file is a video file (S210: video), in S312a the CPU 11 reads the group color correction parameter Col, corresponding to the group number equivalent to current value of the group counter, from the group color correction parameter storage area 405 and uses the group color correction parameter Col to correct color in the frame image data. More specifically, the CPU 11 performs color correction on the frame image data so that the image color correction parameter read from the image color correction parameter storage area 308 for a correction target image O matches the group color correction parameter Col, where the image color correction parameter is the average lightness value of the image. Corrected pixel values (O'(x, y)H, O'(x, y)S, and O'(x, y)V) for the correction target image O are calculated using the following equations, where oV is the image color correction parameter (average lightness value) for the correction target image O and O(x, y)H, O(x, y)S, and O(x, y)V are pixel values for the correction target image O in the HSV color space.

Further, (x, y) indicates coordinates in the image.

$$O'(x,y)H=O(x,y)H$$

$$O'(x,y)S=O(x,y)S$$

$$O'(x,y)V=O(x,y)V \times Col/oV \quad \text{[Equation 15]}$$

In S213 the CPU 11 lays out the frame image data corrected in S312a at a prescribed position in the layout buffer provided in the RAM 13 shown in FIG. 2. Through this process, the CPU 11 can match the average lightness value of the corrected image to the group color correction parameter Col.

However, if the CPU 11 determines that the image file is a still image file (S210: still image), in S314a the CPU 11 corrects color in the still image file by using the group color correction parameter Col according to the same method described in S312a. In S215 the CPU 11 lays out the still image file corrected in S314a at a prescribed position in the layout buffer provided in the RAM 13. Then, the CPU 11 performs subsequent steps of S216-S230 in FIGS. 17 and 18 in the same manner as the first embodiment.

As described with reference to FIG. 13A, the MFP 1 according to the second embodiment can print out an image list 120 including index images 24a, 24b, 24c, and 25 whose colors are visually uniform by first performing color correction on the index images 24a, 24b, 24c, and 25 in order to produce a uniform color (lightness) in each image.

In the second embodiment described above, images are sorted into groups based on their capture dates, and the color (lightness) of images in the same group is made uniform through color correction. Since the intensity of the light source differs considerably between a rainy day and a sunny day, for example, it is highly likely that photographs taken on these days will differ in color. Although the color (lightness) of the two images can be made matched through color correction, the color in the original image may be changed drastically. However, by grouping images by each day (based on the capture date), such a drastic change in color from the original image can be avoided. The MFP 1 may also output the image list 120 whose index images are arranged according to a layout order based on the file time data (the capture time of the still image files and frame image data).

While the invention has been described in detail with reference to specific embodiments thereof, it would be apparent to those skilled in the art that many modifications and variations may be made therein without departing from the spirit of the invention, the scope of which is defined by the attached claims.

For example, while each of the image lists 20 and 120 is printed on recording paper in the first and second embodiments described above, the present invention may also be applied to a case in which each of the image lists 20 and 120 is displayed on the LCD 5 or another display unit.

The present invention may also be applied to a personal computer, for example, whereby each of the image lists 20 and 120 is displayed on the monitor of the personal computer or is printed out on a printer through control by the personal computer.

In the first and second embodiment described above, the MFP 1 outputs each of the image lists 20 and 120 for each of the groups, but the MFP 1 may be configured to output each of the image lists 20 and 120 only for a group selected by the user, for example.

In the first and second embodiments described above, both the video files and the still image files are generated through digital photography, but the present invention may be applied to video files and still image files generated according to another method. In this case, the device may set the layout order of the index images based on a condition other than the capture date and time, such as file creation date and time indicating the date and time that the file was created or the modified date and time of the file.

Further, while still image files and video files are combined on the media card in the first and second embodiments described above, the present invention may also be applied to a case in which only video files are stored on the media card.

Further, while image data stored on a writable media card is the target of processing in the first and second embodiments, the present invention may also be applied when targeting image data stored in internal memory of the MFP 1.

In the first embodiment described above, the MFP 1 matches the size of each index image to the reference characteristic quantity BSSp to achieve a uniform size among index images and matches the color of index image to the reference characteristic quantity BCSp to achieve uniform colors among all index images. However, the MFP 1 may be configured to correct index images using only one of the reference characteristic quantity BSSp and the reference characteristic quantity BCSp.

In the first embodiment described above, the MFP 1 performs conversions for hue, lightness, and saturation in S212*a* and S214*a* of FIG. 11, but the MFP 1 may instead perform conversions for only one or two of these components.

In the first embodiment described above, the MFP 1 calculates the image characteristic quantity SSp and image characteristic quantity CSp in S155 and S156 of FIG. 10 only for still images corresponding to still image files. However, the MFP 1 may be configured to calculate the image characteristic quantity SSp and image characteristic quantity CSp for frame image data, as well, and to calculate corresponding reference characteristic quantities from the image characteristic quantities SSp and image characteristic quantities CSp for both still images and videos in S160 and S161.

In the second embodiment described above, the same group color correction parameter Col is set for each image grouped according to the same capture date, but the group color correction parameter Col may be set for units of pages instead. Further, rather than grouping images in units of days, such as the capture date, the images may be grouped by camera manufacturer, type of image, prescribed units of time, morning and afternoon, units of weeks, or units of months, for example, with the same group color correction parameter Col being set for each image included in the same group.

In the second embodiment described above, the MFP 1 performs color correction by converting the lightness component in the images, but the MFP 1 may perform color correction on the saturation component, hue component, or a combination of the components.

For example, the image color correction parameter may be set to the average saturation value, i.e., the average S value in an image converted to the HSV color space, and the group color correction parameter Col may be set to a median value among average values of the image color correction parameter for each image in the same group. In this case, the average saturation value of a correction target image O is corrected to match the group color correction parameter Col. Corrected pixel values (O'(x, y)H, O'(x, y)S, and O'(x, y)V) for the correction target image O can be found from the following equation, where oS is the image color correction parameter (average saturation value) for the correction target image O read from the image color correction parameter storage area 308; O(x, y)H, O(x, y)S, and O(x, y)V are pixel values of the correction target image O in the HSV color space. Further (x, y) indicates coordinates in the image.

$$O'(x,y)H = O(x,y)H$$

$$O'(x,y)S = O(x,y)S \times Col/oS$$

$$O'(x,y)V = O(x,y)V \qquad \text{[Equation 16]}$$

Through this process, the CPU 11 can match the average saturation value of the corrected image to the group color correction parameter Col.

Alternatively, the image color correction parameter may be set to the average RGB values of pixels within an image whose lightness value is a prescribed value or greater, and the group color correction parameter Col can be set to the median value among average values of the image color correction parameter for each image in the same group (ColR, ColG, and ColB). In this case, the MFP 1 performs color correction on a correction target image O to match the average RGB values read from the image color correction parameter storage area 308 for pixels in the correction target image O having a lightness value greater than or equal to the prescribed value with the group color correction parameter Col. Corrected pixel values (O'(x, y)R, O'(x, y)G, and O'(x, y)B) are found from the following equations, where oR, oG, and oB are the image color correction parameters (average RGB values) and O(x, y)R, O(x, y)G, and O(x, y)B are pixel values for the correction target image O in the RGB color space. Further (x, y) indicates coordinate values in the image; ColV indicates the largest value among ColR, ColG, and ColB; O(x, y)V is the largest value among O(x, y)R, O(x, y)G, and O(x, y)B.

$$O'(x,y)R = O(x,y)R + ColR \times O(x,y)V/ColV$$

$$O'(x,y)G = O(x,y)G + ColG \times O(x,y)V/ColV$$

$$O'(x,y)B = O(x,y)B + ColB \times O(x,y)V/ColV \qquad \text{[Equation 17]}$$

Through this process, the CPU 11 can match average RGB values for pixels having a lightness value greater than or equal to a prescribed value to the group color correction parameter Col in the corrected image. In other words, the MFP 1 can match the color balance of the image to the group color correction parameter Col.

In the second embodiment described above, the MFP 1 sets the group color correction parameter to the average lightness value of an image having the median value among average lightness values for images in the group. However, the MFP 1 may instead calculate the average lightness value for each still image included in the target group as the image color correction parameter, and set the group color correction parameter Col to the image color correction parameter of an image that is closest to the average value among image color correction parameters in the group. The group color correction parameter Col may also be set to the average value of image color correction parameters for still images.

What is claimed is:

1. An image processor comprising:
   an acquiring unit configured to acquire a plurality of image files each corresponding to an image, the plurality of image files includes at least one still image file corresponding to a still image and at least one moving image file including a plurality of frame images;
   a correction unit configured to correct each image by conforming a characteristic quantity of each image to a reference characteristic quantity, the characteristic quantity representing image characteristic of each image;
   an output control unit configured to output the corrected images on a same output plane;
   an extracting unit configured to extract at least one frame image from the plurality of frame images included in each moving image file;
   an image characteristic quantity calculation unit configured to calculate the characteristic quantities for each of the still images and the extracted frame images based on data of the still images and the extracted frame images; and
   a reference characteristic quantity calculation unit configured to calculate the reference characteristic quantity based on one set of the characteristic quantities for the still images and the characteristic quantities for the extracted frame images,
   wherein the characteristic quantity corresponds to a color value representing a color of each image and a size value representing a size of each image,
   wherein the reference characteristic quantity corresponds to a reference color value based on one set of color values for the still images and color values for the extracted frame images and to a reference size value based on one set of size values for the still images and size values for the extracted frame images,
   wherein the correction unit corrects the still images and the extracted frame images by conforming each color value of the still images and the extracted frame images to the reference color value after correcting the still images and the extracted images by conforming each size value of the still images and the extracted images to the reference size value,
   wherein the output control unit outputs the corrected still images and the corrected frame images on the same output plane.

2. The image processor according to claim 1, further comprising a discriminating unit configured to discriminate between the still image file and the moving image file, and
   wherein the reference characteristic quantity calculation unit calculates the reference characteristic quantity based on the characteristic quantities for the still images corresponding to the still image files discriminated by the discriminating unit.

3. The image processor according to claim 1, wherein the color value corresponds to at least one of a hue value representing hue of each image, a lightness value representing lightness of each image, and a saturation value representing saturation of each image.

4. The image processor according to claim 1, wherein the size value corresponds to a width value representing width of each image, a height value representing height of each image, and an aspect ration value representing aspect ratio of each image.

5. The image processor according to claim 1, further comprising a recording unit, and
   wherein the output control unit controls the recording unit to record the corrected still images and the corrected frame images on a same sheet of paper.

* * * * *